US011922697B1

(12) United States Patent
Xu

(10) Patent No.: US 11,922,697 B1
(45) Date of Patent: Mar. 5, 2024

(54) DYNAMICALLY ADJUSTING ACTIVATION SENSOR PARAMETERS ON SECURITY CAMERAS USING COMPUTER VISION

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 17 days.

(21) Appl. No.: 17/735,057

(22) Filed: May 2, 2022

(51) Int. Cl.
| | | |
|---|---|---|
| *G06V 20/52* | (2022.01) | |
| *G06V 10/74* | (2022.01) | |
| *G06V 10/764* | (2022.01) | |
| *H04N 7/18* | (2006.01) | |
| *H04N 23/65* | (2023.01) | |
| *G01V 8/00* | (2006.01) | |
| *G01V 8/10* | (2006.01) | |
| *G06V 40/10* | (2022.01) | |
| *G08B 13/00* | (2006.01) | |

(52) U.S. Cl.
CPC ............. *G06V 20/52* (2022.01); *G06V 10/74* (2022.01); *G06V 10/764* (2022.01); *H04N 7/188* (2013.01); *H04N 23/651* (2023.01); *G01V 8/005* (2013.01); *G01V 8/10* (2013.01); *G06V 40/10* (2022.01); *G08B 13/00* (2013.01)

(58) Field of Classification Search
CPC ...... G06V 20/52; G06V 10/74; G06V 10/764; G06V 40/10; H04N 7/188; H04N 23/651; G01V 8/005; G01V 8/10; G08B 13/00
See application file for complete search history.

(56) References Cited

U.S. PATENT DOCUMENTS

| | | | | |
|---|---|---|---|---|
| 11,138,439 | B1* | 10/2021 | Lin | G06V 20/52 |
| 2005/0018879 | A1* | 1/2005 | Ito | H04N 7/183 |
| | | | | 348/E7.087 |
| 2010/0013917 | A1* | 1/2010 | Hanna | G08B 13/19689 |
| | | | | 348/E13.001 |
| 2015/0244989 | A1* | 8/2015 | Liao | H04N 23/69 |
| | | | | 348/159 |
| 2019/0261243 | A1* | 8/2019 | Amini | H04N 21/43637 |

\* cited by examiner

*Primary Examiner* — Tat C Chio

(74) *Attorney, Agent, or Firm* — Christopher P. Maiorana, PC

(57) ABSTRACT

An apparatus comprising an interface and a processor. The interface may be configured to receive pixel data generated by a capture device and an activation signal generated by at least one of a plurality of sensors. The processor may be configured to process the pixel data arranged as video frames, perform computer vision on the video frames to detect objects, perform a classification of the objects, present a control signal in response to receiving the activation signal, determine whether there is a match between the classification and an object class and generate a calibration signal in response to the match. The computer vision may determine which zone that the objects have been detected in. Each zone may comprise a coverage region of one of the sensors. The calibration signal may adjust parameters of the sensors that correspond to the zone with the objects that do not have the match.

20 Claims, 11 Drawing Sheets

DYNAMICALLY ADJUSTING ACTIVATION SENSOR PARAMETERS ON SECURITY CAMERAS USING COMPUTER VISION

FIELD OF THE INVENTION

The invention relates to security cameras generally and, more particularly, to a method and/or apparatus for implementing dynamically adjusting activation sensor parameters on security cameras using computer vision.

BACKGROUND

Some security cameras, especially home security cameras, by design record video 24×7. Some security cameras implement event-activated recording. In event-activated recording, video is only recorded when an event is detected. Usually the event is detected based on motion. Passive infrared (PIR) sensors and radar sensors are commonly used to detect motion in order to wake-up an event-activated security camera to initiate video recording.

Event-activated detection security cameras often are battery powered devices such as video doorbell cameras, indoor PIR cameras, outdoor powered flood-light cameras. Event-activated security cameras conserve power or storage capacity by remaining in a powered off mode or do not actually encode video when no motion is detected. Video recording or encoding is activated in response to the motion, which relies on PIR sensors, or radar sensors as a trigger mechanism. PIR sensors and radar sensors can detect motion on a low power draw, while the rest of the system is in a power off mode.

PIR sensors are extremely sensitive and error prone. PIR sensors are conventionally calibrated manually by the end-user. However, conditions change dynamically and PIR/radar sensors are unable to be adjusted dynamically. Balancing sensor distance and the number of alerts generated can be a source of frustration for an end-user. For example, on a windy day, a waving branch could be close to the camera and will keep triggering events, annoying the end-user. In another example, when the sun is at certain angle, the sunlight could continue to trigger the camera for the next 30 minutes.

Security cameras often feature a video (image) Field of View (FOV) larger than a single PIR/radar sensor can cover. To address the small coverage region of motion detection sensors, camera manufactures use multiple PIR sensors or radar sensors. A camera maker could also allow the end user to manually adjust the PIR/radar sensor range and sensitivity. With multiple motion sensors implemented, the end-user has to manually calibrate each coverage region individually.

It would be desirable to implement dynamically adjusting activation sensor parameters on security cameras using computer vision.

SUMMARY

The invention concerns an apparatus comprising an interface and a processor. The interface may be configured to receive pixel data generated by a capture device and an activation signal generated by at least one of a plurality of activation sensors. The processor may be configured to receive the pixel data from the interface, process the pixel data arranged as video frames, perform computer vision operations on the video frames to detect objects, perform a classification of the objects detected based on characteristics of the objects, present a control signal to the capture device in response to receiving the activation signal, determine whether there is a match between the classification of the objects and a predetermined object class and generate a calibration signal in response to the match not being detected. The capture device may be configured to capture the pixel data in response to the control signal. The computer vision operations may be configured to determine at least one of a plurality of zones that the objects have been detected in. Each of the plurality of zones may comprise a coverage region of one of the activation sensors. The calibration signal may be configured to adjust operating parameters of one of the activation sensors that corresponds to the one of the plurality of zones that comprises the objects that do not have the match.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
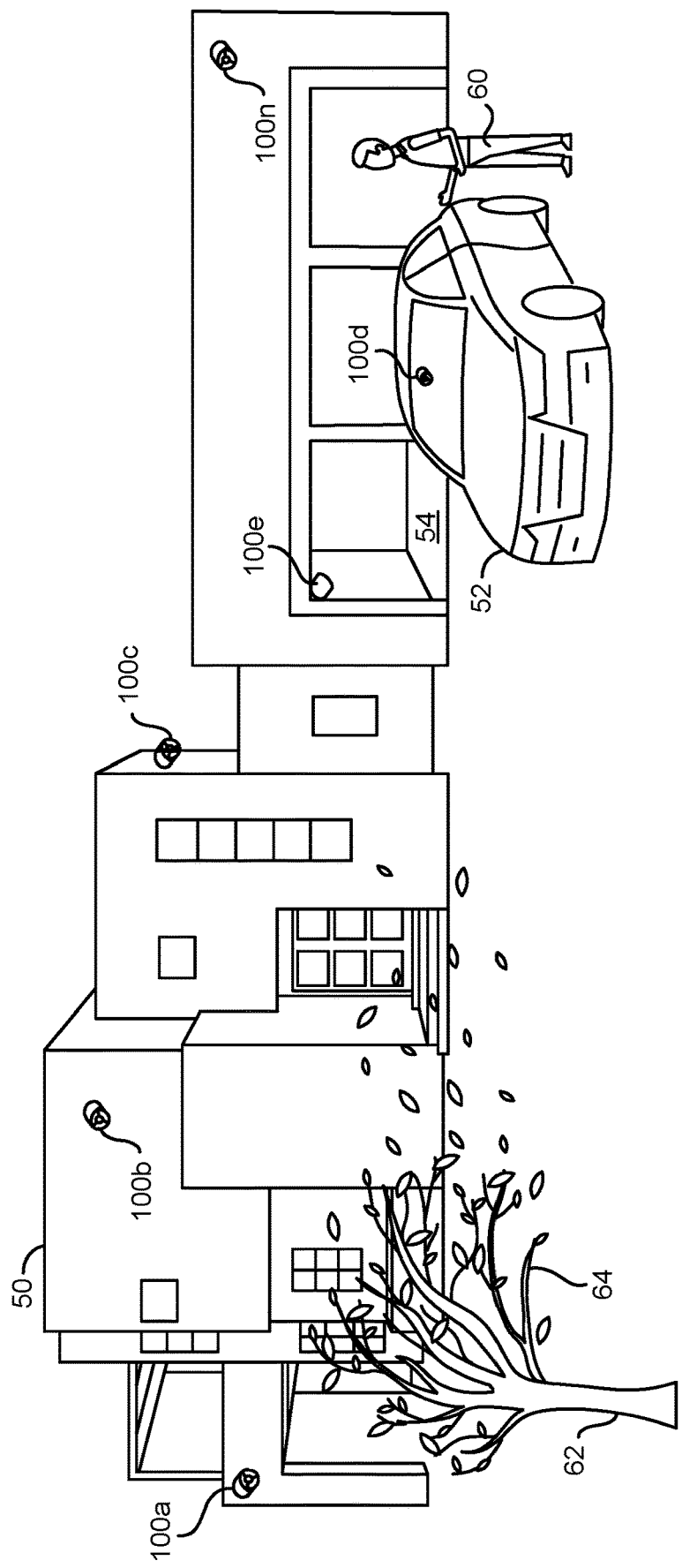
FIG. 1 is a diagram illustrating an example context of the present invention.

Embodiments of the present invention include providing dynamically adjusting activation sensor parameters on security cameras using computer vision that may (i) limit false positive readings from activation sensors, (ii) independently control detection zones for multiple activation sensors, (iii) implement object detection and/or person detection, (iv) perform object detection in response to being triggered by a PIR/radar sensor, (v) check for false positives using computer vision after being triggered, (vi) adjust detection range/sensitivity for a detection zone in response to object detection results, (vii) temporarily disable a detection zone in response to object detection results, (viii) provide automatic adjustments for multiple activation sensors without human intervention, (ix) manage multiple trigger devices that provide combined coverage to match a larger field of view of an image sensor and/or (x) be implemented as one or more integrated circuits.

Embodiments of the present invention may be configured to dynamically adjust activation/trigger sensors in response to performing computer vision operations. The activation sensors may be implemented to enable a capture device to operate in a low-powered (or sleep) mode of operation. The activation sensors may provide a threshold for activating (e.g., triggering, waking up, powering on, etc.) the capture device. The activation sensors may enable the capture device to operate in a lower power mode when there is likely to be no objects of interest in a field of view of an image sensor and then activate into a higher power mode (e.g., an image capture mode of operation) to capture and/or encode video when there is likely to be an object of interest in the field of view of the image sensor.

Dynamically adjusting activation sensors may prevent false positives. False positives may result in the capture device switching to the image capture mode of operation because the activation sensors generated a detection result even though no object of interest was actually present. False positives may result in unnecessary battery drain (e.g., by exiting the low powered mode of operation). False positive may result in unnecessary consumption of storage capacity (e.g., recording data that may be uninteresting to an end-user, which may leave less storage space for potential recordings that may be interesting to the end-user). False positives may result in undesired alerts (e.g., the capture device may send alerts to an end-user in response to recording/encoding being activated).

The capture device implemented may comprise an image sensor with a field of view configured to capture a region of interest (e.g., a wide angle field of view). In an example, the capture device may be implemented as a security camera configured to monitor a secure location. The field of view of the image sensor may be larger than detection zones of an activation sensor. Multiple activation sensors may be implemented to provide a combination of detection zones that may provide coverage similar to the field of view of the image sensor. However, since any one of the activation sensors may activate the capture device, with multiple detection zones there may be a greater likelihood that one of the zones may provide a false positive. A single set of parameters applied to each of the activation sensors may not provide a granular level of control to prevent false positives. For example, each of the detection zones may experience different conditions (e.g., sunlight, shade, moving branches, movement of people, movement of vehicles, etc.). Dynamically adjusting the activation sensors in response to performing computer vision operations may enable automatic individualized management for the detection zones in order to limit a likelihood of a false positive.

Embodiments of the present invention may provide a mechanism to implement computer vision in order to automatically adjust operating parameters for the activation sensors (e.g., passive infrared (PIR) sensors, radar, lidar, etc.). In an example, the operating parameters may comprise a range and/or a sensitivity. Automatically adjusting the operating parameters may provide a balance between various operating choices, such as security coverage range versus number of alerts. Without automatic adjustment of the operating parameters, the end-user may be left with multiple difficult decisions. For example, the automatic adjustment of the operating parameters for each of the activation sensors may save the end-user from having to individually configure the operating parameters for multiple activation sensors. Furthermore, the automatic adjustment of the operating parameters may enable real-time adjustments to the operating parameters of the activation sensors in response to changing conditions (e.g., amount of sunlight that the different detection regions receive at different times of day and/or times of the year, increasing or decreasing amounts of wind, vehicle patterns, etc.).

Embodiments of the present invention may be configured to implement computer vision operations locally on a processor and/or a system-on-chip (SoC). The computer vision operations may be configured to detect events and/or objects of interest (e.g., object detection, animal detection, person detection, etc.). When the capture device is initially triggered (e.g., one of the activation sensors triggers the capture device in response to a detection in a detection zone), the computer vision operations may be performed. If the computer vision operations determine that no object and/or no event of interest is detected in the detection zone that corresponds to the activation sensor that provided the activation, then the operating parameters of the activation sensor may be adjusted (e.g., to reduce future false positives). In an example, a range of the activation sensor may be reduced. In another example, a sensitivity of the activation sensor may be reduced. In yet another example, the activation sensor may be disabled for a predetermined amount of time (e.g., ignore all detections from a particular one of the coverage zones for thirty minutes). The adjustments to the operating parameters may be adjusted automatically for the end-user (e.g., without end-user intervention). In some embodiments, the end-user may over-ride the automatic adjustments.

The automatic adjustments may conserve a power supply provided by a battery. In an example, on a windy day, a swaying or moving tree branch (e.g., an uninteresting object/event) may continually generate a response from one of the activation sensors. Each undesired event that activates the capture device may lead to battery energy consumption. In one example, after the tree branch is detected a particular number of times (e.g., a user-defined threshold), then the particular activation devices that correspond to the coverage zone with the tree branch may be disabled.

Referring to FIG. 1, a diagram illustrating an example context of the present invention is shown. A home 50, a vehicle 52, and a garage interior 54 are shown. A person 60 is shown near the vehicle 52. A tree 62 with tree branches 64 is shown in front of the home 50. Camera systems 100*a*-100*n* are shown. Each of the cameras 100*a*-100*n* may be configured to generate pixel data of the environment, process the pixel data arranged as video frames, encode the video frames and/or generate notifications in response to objects detected in the video frames. For example, each of the cameras 100*a*-100*n* may be configured to operate independently of each other. Each of the cameras 100*a*-100*n* may capture video and generate video streams and/or generate notifications about content detected in the video streams. In one example, the respective video streams may be uploaded to a cloud storage service. In another example, the respective video streams may be stored locally (e.g., on a microSD card, to a local network attached storage device, etc.). In yet another example, the notifications may be communicated to a user device (e.g., a smartphone, a smartwatch, etc.).

Each of the cameras 100*a*-100*n* may be configured to detect different or the same events/objects that may be considered interesting. For example, the camera system 100*n* may capture an area near an entrance of the home 50. For an entrance of the home 50, objects/events of interest may be detecting people. The camera system 100n may be configured to analyze video frames to detect people and generate a notification in response to detecting the person 60. In another example, the camera system 100d may capture an area near the vehicle 52. For the vehicle 52, objects/events of interest may be detecting other vehicles and pedestrians. In yet another example, the camera system 100e may capture the garage interior 54. For the garage interior 54, the camera system 100e may be configured to detect people (e.g., potential intruders and/or burglars) and/or various items (e.g., determine whether tools, or vehicles have been stolen).

Each of the cameras 100a-100n may operate independently from each other. For example, each of the cameras 100a-100n may individually analyze the pixel data captured and perform the event/object detection locally (e.g., relying on embedded features implemented by each of the camera systems 100a-100n). In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

In some embodiments, the cameras 100a-100n may be powered off or operate in a sleep mode of operation and then be activated in response to an activation signal. For example, the cameras 100a-100n may be battery powered cameras, and may operate in a sleep mode of operation that does not capture and/or encode video frames to conserve power during particular scenarios. The activation signal may be generated by a sensor that may detect an environmental condition. In an example, the sensor may be a motion sensor configured to generate the activation signal in response to detecting motion. The environmental condition that activates the cameras 100a-100n may be selected in order to conserve battery power and/or preserve recording resources (e.g., memory capacity, processing power, heat generation, etc.) until there is a high probability that content of interest may be in a field of view of one or more of the cameras 100a-100n. For example, a recording of a generally static scene (e.g., no people, vehicles, animals, etc.) may not be of interest to an end-user.

The cameras 100a-100n may be configured to activate (e.g., enter a high power image capture mode of operation, initiate recording, perform computer vision operations, etc.) in response to the activation signal. The tree 62 may be an example of content that may not be interesting to the end-user. However, the tree branches 64 may move (e.g., sway because of windy conditions), which may be sufficient movement to trigger the activation signal. For example, despite using the activation as an initial filter for ignoring uninteresting content, the tree branches 64 may still trigger the image capture mode of operation of the cameras 100a-100n. The camera systems 100a-100n may be configured to implement computer vision operations in order to determine which objects have triggered the activation signal (e.g., detect the tree 62 and/or the tree branches 64) and calibrate the sensor that triggered the activation signal. For example, the cameras 100a-100n may be activated by the activation signal, perform computer vision operations to detect the tree 62 and/or the tree branches 64, determine that a false positive activation was performed, and calibrate the activation sensor(s) that detected the false positive in order to prevent the tree 62 and/or the tree branches 64 from activating the cameras 100a-100n.

Figure 2:
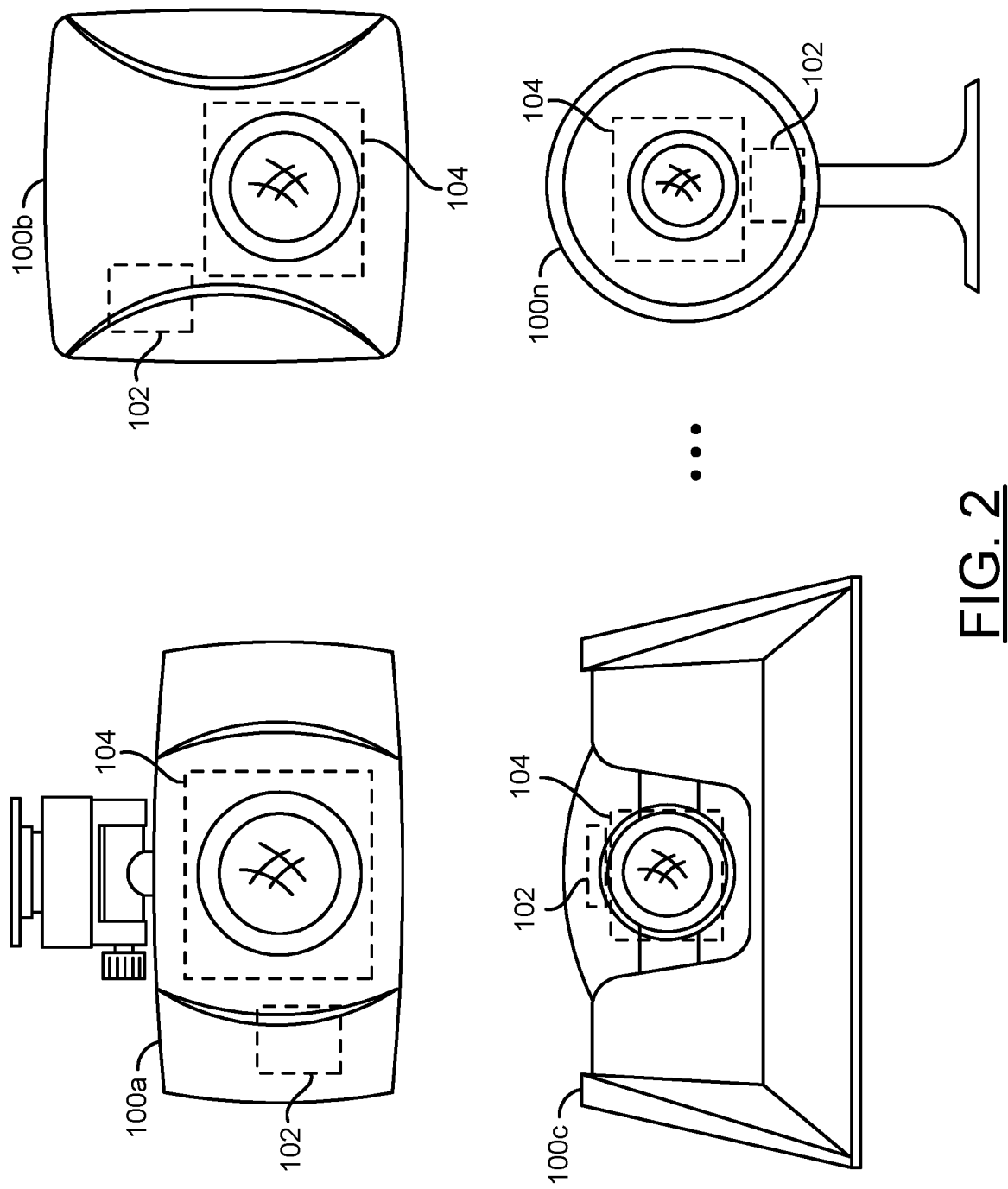
FIG. 2 is a diagram illustrating example cameras implementing an example embodiment of the present invention.

Referring to FIG. 2, a diagram illustrating example cameras implementing an example embodiment of the present invention is shown. Camera systems 100a-100n are shown. Each camera system 100a-100n may have a different style case and/or use. For example, the camera 100a may be an action camera, the camera 100b may be a ceiling mounted security camera, the camera 100c may be a windshield mounted vehicle camera, the camera 100n may be webcam, etc. Other types of cameras may be implemented (e.g., home security cameras, battery powered cameras, doorbell cameras, trail cameras, stereo cameras, etc.). The design/style of the cameras 100a-100n may be varied according to the design criteria of a particular implementation.

Each of the camera systems 100a-100n may comprise a block (or circuit) 102 and/or a block (or circuit) 104. The circuit 102 may implement a processor. The circuit 104 may implement a capture device. The camera systems 100a-100n may comprise other components (not shown). Details of the components of the cameras 100a-100n may be described in association with FIG. 3.

The processor 102 may be configured to implement one or more artificial neural networks (ANNs) configured to provide artificial intelligence and/or computer vision. In one example, one or more of the ANNs may include a convolutional neural network (CNN) and/or generative adversarial network (GAN) trained to provide image processing, object detection, object recognition, object classification, etc. The processor 102 may be configured to implement a video encoder. The processor 102 may determine whether to generate and/or suppress a notification in response to the objects detected (e.g., using the ANNs) in the captured video frames. The processor 102 may be configured to switch between a high power image capture mode of operation (e.g., video capture, video encoding, computer vision operations, network connectivity, etc.) and a low powered mode of operation (e.g., a sleep mode, reduced functionality, etc.). The capture device 104 may be configured to capture pixel data that may be used by the processor 102 to generate video frames.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), video encoding and/or video transcoding on-device. For example, even advanced processes such as computer vision may be performed by the processor 102 without uploading video data to a cloud service in order to offload computation-heavy functions (e.g., computer vision, video encoding, video transcoding, etc.).

Figure 3:
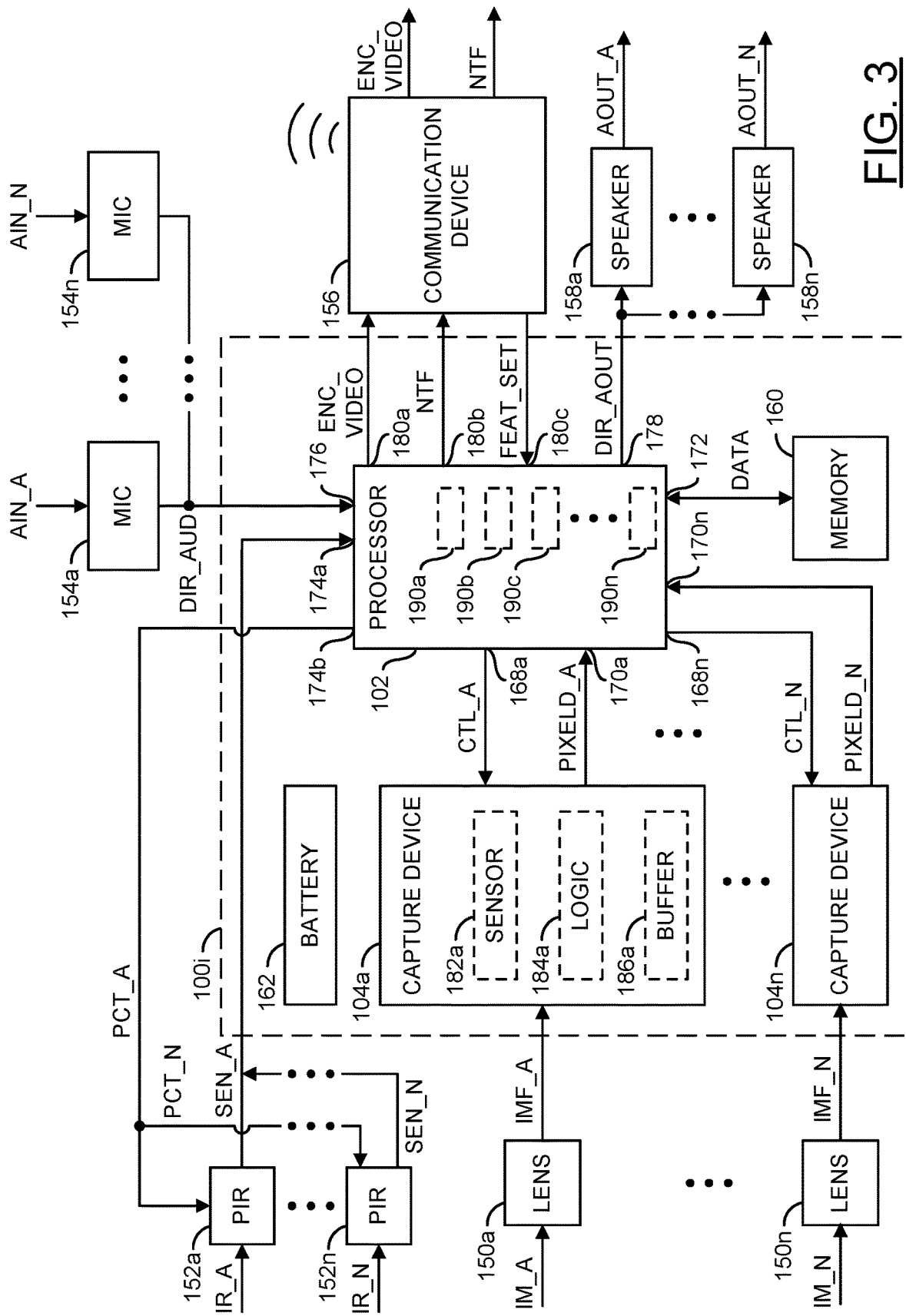
FIG. 3 is a block diagram illustrating components of an apparatus configured to provide dynamic adjustment of sensor range/sensitivity using computer vision.

Referring to FIG. 3, a block diagram illustrating components of an apparatus configured to provide dynamic adjustment of sensor range/sensitivity using computer vision is shown. A block diagram of the camera system 100i is shown. The camera system 100i may be are presentative example of the camera systems 100a-100n shown in association with FIGS. 1-2. The camera system 100i generally comprises the processor 102, the capture devices 104a-104n, blocks (or circuits) 150a-150n, blocks (or circuits) 152a-152n, blocks (or circuits) 154a-154n, a block (or circuit) 156, blocks (or circuits) 158a-158n, a block (or circuit) 160 and/or a block (or circuit) 162. The blocks 150a-150n may implement lenses. The circuits 152a-152n may implement one or more sensors. The circuits 154a-154n may implement microphones (e.g., audio capture devices). The circuit 156 may implement a communication device. The circuits 158a-158n may implement audio output devices (e.g., speakers). The circuit 160 may implement a memory. The circuit 162 may implement a power supply (e.g., a battery). The camera system 100i may comprise other components (not shown). In the example shown, some of the components 150-158 are shown external to the camera system 100i. However, the components 150-158 may be implemented within and/or attached to the camera system 100i (e.g., the speakers 158a-158n may provide better functionality if not located inside a housing of the camera system 100i). The number, type and/or arrangement of the components of the camera system 100i may be varied according to the design criteria of a particular implementation.

In an example implementation, the processor 102 may be implemented as a video processor. The processor 102 may comprise outputs 168a-168n. The processor 102 may comprise inputs 170a-170n and/or other inputs. The processor 102 may comprise an input/output 172. The processor 102 may comprise an input 174a and an output 174b. The processor 102 may comprise an input 176. The processor 102 may comprise an output 178. The processor 102 may comprise outputs 180a-180b and an input 180c. The number of inputs, outputs and/or bi-directional ports implemented by the processor 102 may be varied according to the design criteria of a particular implementation.

In the embodiment shown, the capture devices 104a-104n may be components of the camera system 100i. In some embodiments, the capture devices 104a-104n may be separate devices (e.g., remotely connected to the camera system 100i, such as a drone, a robot and/or a system of security cameras) configured capture video data and send data to the camera system 100i. In one example, the capture devices 104a-104n may be implemented as part of an autonomous robot configured to patrol particular paths such as hallways. Similarly, in the example shown, the sensors 152a-152n, the microphones 154a-154n, the wireless communication device 156, and/or the speakers 158a-158n are shown external to the camera system 100i, but in some embodiments may be a component of (e.g., within) the camera system 100i.

The camera system 100i may receive one or more signals (e.g., IMF_A-IMF_N), signals (e.g., SEN_A-SEN_N), a signal (e.g., FEAT_SET) and/or one or more signals (e.g., DIR_AUD). The camera system 100i may present signals (e.g., PCT_A-PCT_N), a signal (e.g., ENC_VIDEO), a signal (e.g., NTF) and/or a signal (e.g., DIR_AOUT). The capture devices 104a-104n may receive the signals IMF_A-IMF_N from the corresponding lenses 150a-150n. The processor 102 may receive the signals SEN_A-SEN_N from the sensors 152a-152n. The processor 102 may receive the signal DIR_AUD from the microphones 154a-154n. The processor 102 may present the signals PCT_A-PCT_N to the sensors 152a-152n. The processor 102 may present the signal ENC_VIDEO and the signal NTF to the communication device 156 and receive the signal FEAT_SET from the communication device 156. For example, the wireless communication device 156 may be a radio-frequency (RF) transmitter. In another example, the communication device 156 may be a Wi-Fi module. In another example, the communication device 156 may be a device capable of implementing RF transmission, Wi-Fi, Bluetooth and/or other wireless communication protocols. In some embodiments, the signal ENC_VIDEO may be presented to a display device connected to the camera 100i. The processor 102 may present the signal DIR_AOUT to the speakers 158a-158n.

The lenses 150a-150n may capture signals (e.g., IM_A-IM_N). The signals IM_A-IM_N may be an image (e.g., an analog image) of the environment near the camera system 100i presented by the lenses 150a-150n to the capture devices 104a-104n as the signals IMF_A-IMF_N. The lenses 150a-150n may be implemented as an optical lens. The lenses 150a-150n may provide a zooming feature and/or a focusing feature. The capture devices 104a-104n and/or the lenses 150a-150n may be implemented, in one example, as a single lens-sensor assembly. In another example, the lenses 150a-150n may be separate from the capture devices 104a-104n. The capture devices 104a-104n are shown within the circuit 100i. In an example implementation, the capture devices 104a-104n may be implemented outside of the circuit 100i (e.g., along with the lenses 150a-150n as part of a lens/capture device assembly).

In some embodiments, two or more of the lenses 150a-150n may be configured as a stereo pair of lenses. For example, the camera 100i may implement stereo vision. The lenses 150a-150n implemented as a stereo pair may be implemented at a pre-determined distance apart from each other and at a pre-determined inward angle. The pre-determined distance and/or the pre-determined inward angle may be used by the processor 102 to build disparity maps for stereo vision.

The capture devices 104a-104n may be configured to capture image data for video (e.g., the signals IMF_A-IMF_N from the lenses 150a-150n). In some embodiments, the capture devices 104a-104n may be video capturing devices such as cameras. The capture devices 104a-104n may capture data received through the lenses 150a-150n to generate raw pixel data. In some embodiments, the capture devices 104a-104n may capture data received through the lenses 150a-150n to generate bitstreams (e.g., generate video frames). For example, the capture devices 104a-104n may receive focused light from the lenses 150a-150n. The lenses 150a-150n may be directed, tilted, panned, zoomed and/or rotated to provide a targeted view from the camera system 100i (e.g., a view for a video frame, a view for a panoramic video frame captured using multiple capture devices 104a-104n, a target image and reference image view for stereo vision, etc.).

The capture devices 104a-104n may receive control signals (e.g., CTL_A-CTL_N). The control signals CTL_A-CTL_N may enable and/or disable the capture devices 104a-104n. The signals CTL_A-CTL_N may be generated by the outputs 168a-168n of the processor 102. The capture devices 104a-104n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 102.

The capture devices 104a-104n may transform the received focused light signals IMF_A-IMF_N into digital data (e.g., bitstreams). In some embodiments, the capture devices 104a-104n may perform an analog to digital conversion. For example, the capture devices 104a-104n may perform a photoelectric conversion of the focused light received by the lenses 150a-150n. The capture devices 104a-104n may transform the bitstreams into pixel data, images and/or video frames. In some embodiments, the pixel data generated by the capture devices 104a-104n may be uncompressed and/or raw data generated in response to the focused light from the lenses 150a-150n. In some embodiments, the output of the capture devices 104a-104n may be digital video signals.

The sensors 152a-152n may comprise one or more input devices. The sensors 152a-152n may be configured to detect physical input from the environment and convert the physical input into computer readable signals. The signals SEN_A-SEN_N may comprise the computer readable signals generated by the sensors 152a-152n. The signals PCT_A-PCT_N may comprise computer readable and/or electronic signals received by the sensors 152a-152n. In an example, one of the sensors 152a-152n may be configured to detect an amount of light and present a computer readable signal representing the amount of light detected. In another example, one of the sensors 152a-152n may be configured to detect motion and present a computer readable signal representing the amount of motion detected. The sensors 152a-152n may be configured to detect temperature (e.g., a thermometer, passive infrared (PIR) sensors, etc.), orientation (e.g., a gyroscope, a compass, etc.), a movement speed (e.g., an accelerometer), etc. The types of input detected by the sensors 152 may be varied according to the design criteria of a particular implementation.

The data provided in the signals SEN_A-SEN_N provided by the sensors 152a-152n may be read and/or interpreted by the processor 102. The processor 102 may use the data provided by the signals SEN_A-SEN_N for various operations. In some embodiments, the processor 102 may use a light reading from the sensors 152a-152n to determine whether to activate an infrared light source (e.g., to provide night vision). In another example, the processor 102 may use information about movement from an accelerometer and/or a gyroscope to perform motion correction on video frames generated. In yet another example, the processor 102 may use motion detected by a motion sensor (e.g., PIR) to enable video recording and/or send a notification. The types of operations performed by the processor 102 in response to the signals SEN_A-SEN_N may be varied according to the design criteria of a particular implementation.

The sensors 152a-152n may implement activation sensors. In the example shown, the activation sensors 152a-152n may implement PIR sensors. In another example, the activation sensors 152a-152n may implement radar sensors. In yet another example, the activation sensors 152a-152n may implement lidar sensors. In still another example, the activation sensors 152a-152n may implement laser sensors. In another example, the activation sensors 152a-152n may implement a combination of sensor technologies. The type of activation sensors 152a-152n implemented may be varied according to the design criteria of a particular implementation.

The activation sensors 152a-152n may each be configured to detect respective input signals (e.g., IR_A-IR_N). The activation sensors 152a-152n may each be configured to generate a respective one of the activation signals SEN_A-SEN_N in response to detecting the respective input signals IR_A-IR_N. In the example shown, the input signals IR_A-IR_N may comprise infrared light and/or motion input. The activation sensors 152a-152n may be configured to determine whether the amount of infrared light and/or motion input detected meets a pre-determined threshold. If the amount of infrared light and/or motion input that meets the pre-determined threshold is detected by one or more of the activation sensors 152a-152n, the activation sensors 152a-152n that detected the sufficient amount of infrared light and/or motion input may generate the activation signals SEN_A-SEN_N.

The processor 102 may be configured to receive the activation signals SEN_A-SEN_N at the input 174a. The processor 102 may be configured to switch from the low powered mode of operation to the image capture mode of operation in response to one or more of the activation signals SEN_A-SEN_N. For example, the processor 102 may be in a sleep mode (e.g., not receiving the pixel data from the capture devices 104a-104n and/or not generating the video frames from the pixel data, not encoding video frames, not performing computer vision operations, not generating notifications, etc.) and change to the image capture mode of operation (e.g., an image capture mode) in response to one or more of the activation signals SEN_A-SEN_N. During the image capture mode of operation, the processor 102 may perform computer vision operations to detect objects of interest. After a pre-determined amount of time of not detecting any objects of interest, the processor 102 may change to the sleep mode of operation.

The processor 102 may be configured to generate the signals PCT_A-PCT_N. The signals PCT_A-PCT_N may be parameter control signals. The processor 102 may generate the parameter control signals PCT_A-PCT_N from the output 174b. The signals PCT_A-PCT_N may each be presented to a respective one of the activation sensors 152a-152n. The parameter control signals PCT_A-PCT_N may comprise an operating parameter configuration for the respective activation sensors 152a-152n. The operating parameter configuration may comprise activation thresholds for each of the activation sensors 152a-152n. In one example, the operating parameter configuration may comprise an amount of infrared light and/or motion for the pre-determined threshold (e.g., a sensitivity) for the activation sensors 152a-152n to generate the activation signals SEN_A-SEN_N. In another example, the operating parameter configuration may comprise an amount of time for deactivating one or more of the activation sensors 152a-152n (e.g., the activation sensors 152a-152n may not generate the signals SEN_A-SEN_N regardless of the amount of infrared light and/or motion in the environment during the deactivation time). In yet another example, the operating parameter configuration may comprise a detection distance for the activation sensors 152a-152n (e.g., a range of detection). The types and/or the amount of adjustment for the configuration parameters may be varied according to the design criteria of a particular implementation.

The parameter control signals PCT_A-PCT_N may enable the processor 102 to automatically adjust the operating parameter configuration independently for each of the activation sensors 152a-152n. In some embodiments, end-users may manually adjust the parameter configuration for the activation sensors 152a-152n. The parameter control signals PCT_A-PCT_N may be configured to enable the processor 102 to adjust the parameter configuration individually for each of the activation sensors 152a-152n without human intervention. For example, the processor 102 may be configured to detect objects to determine whether the generation of the activation signals SEN_A-SEN_N was a false positive and adjust the operating parameter configuration in order to prevent similar detections by the same activation sensors 152a-152n from continuing to detect false positives.

The processor 102 may generate the control signals CTL_A-CTL_N in response to the activation signals SEN_A-SEN_N. The processor 102 may provide the control signals CTL_A-CTL_N to the capture devices 104a-104n via the respective output ports 168a-168n. The control signals CTL_A-CTL_N may be configured to activate or deactivate the capture devices 104a-104n. For example, the capture devices 104a-104n may be powered down (e.g., not generating the pixel data PIXELD_A-PIXELD_N in response to the focused light input IMF_A-IMF_N) when the processor 102 is in the low powered mode of operation. The processor 102 may activate the image capture and/or video recording mode of operation in response to one or more of the activation signals SEN_A-SEN_N. To enable video capture and/or the generation of video frames when in the image capture mode of operation, the processor 102 may enable the capture devices 102a-102n. The processor 102 may generate the control signals CTL_A-CTL_N to enable the capture devices 104a-104n when the image capture mode of operation (e.g., the high power mode of operation) is activated.

The control signals CTL_A-CTL_N may be further configured to deactivate the capture devices 104a-104n. For example, when the processor 102 returns to the low powered mode of operation from the image capture mode of operation, the processor 102 may disable the capture devices 104a-104n. The processor 102 may present the control signals CTL_A-CTL_N to the capture devices 104a-104n via the outputs 168a-168n in order to disable the capture devices 104a-104n (e.g., stop the capture devices 104a-104n from generating the pixel data PIXELD_A-PIXELD_N in response to the focused light IMF_A-IMF_N) when returning to the low powered mode of operation. In an example, the processor 102 may disable the capture devices 104a-104n after a predetermined amount of time (e.g., video recording may be activated for particular intervals of time after the image capture mode of operation is activated). In yet another example, the processor 102 may disable the capture devices 104a-104n after all the objects of interest are no longer detected. The timing and/or conditions for activating and/or deactivating the capture devices 104a-104n via the control signals CTL_A-CTL_N may be varied according to the design criteria of a particular implementation.

The communication device 156 may send and/or receive data to/from the camera system 100i. In some embodiments, the communication device 156 may be implemented as a wireless communications module. In some embodiments, the communication device 156 may be implemented as a satellite connection to a proprietary system. In one example, the communication device 156 may be a hard-wired data port (e.g., a USB port, a mini-USB port, a USB-C connector, HDMI port, an Ethernet port, a DisplayPort interface, a Lightning port, etc.). In another example, the communication device 156 may be a wireless data interface (e.g., Wi-Fi, Bluetooth, ZigBee, cellular, etc.).

The communication device 156 may be configured to receive the signal FEAT_SET. The signal FEAT_SET may comprise a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 102 may send the control signals CTL_A-CTL_N to the capture devices 104a-104n via the output ports 168a-168n. The processor 102 may receive the signals PIXELD_A-PIXELD_N from the capture devices 104a-104n at the inputs 170a-170n. The processor 102 may send/receive a signal (e.g., DATA) to/from the memory 160 at the input/output 172. The processor 102 may receive the signals SEN_A-SEN_N from the activation sensors 152a-152n at the input port 174a. The processor 102 may send the signals PCT_A-PCT_N to the activation sensors 152a-152n via the output port 174b. The processor 102 may receive the signal DIR_AUD from the microphones 154a-154n at the port 176. The processor 102 may send the signal DIR_AOUT to the speakers 158a-158n via the port 178. The processor 102 may send the signal ENC_VIDEO to the communication device 156 via the output port 180a and the signal NTF to the communication device 156 via the output port 180b. The processor 102 may receive the signal FEAT_SET from the communication device 156 via the input port 180c. In an example, the processor 102 may be connected through a bi-directional interface (or connection) to the capture devices 104a-104n, the activation sensors 152a-152n, the microphones 154a-154n, the communication device 156, and/or the speakers 158a-158n and/or the memory 160. The processor 102 may store and/or retrieve data from the memory 160. The memory 160 may be configured to store computer readable/executable instructions (or firmware). The instructions, when executed by the processor 102, may perform a number of steps.

The signal PIXELD_A-PIXELD_N may comprise raw pixel data providing a field of view captured by the lenses 150a-150n. The processor 102 may be configured to generate video frames from the pixel data PIXELD_A-PIXELD_N. The video frames generated by the processor 102 may be used internal to the processor 102 (e.g., to perform video encoding, video transcoding, perform computer vision operations, etc.). In some embodiments, the video frames may be communicated to the memory 160 for temporary storage. The processor 102 may be configured to generate encoded video frames and communicate the encoded video frames to the communication device 156 as the signal ENC_VIDEO.

The processor 102 may be configured to make decisions based on analysis of the video frames generated from the signals PIXELD_A-PIXELD_N. The processor 102 may generate the signal ENC_VIDEO, the signal DATA, the signal DIR_AOUT and/or other signals (not shown). The signal ENC_VIDEO, the signals CTL_A-CTL_N, the signal NTF, the signal DATA, the signals PCT_A-PCT_N and/or the signal DIR_AOUT may each be generated (in part) based on one or more decisions made and/or functions performed by the processor 102. The decisions made and/or functions performed by the processor 102 may be determined based on data received by the processor 102 at the inputs 170a-170n (e.g., the signals PIXELD_A-PIXELD_N), the input 172, the input 174a (e.g., the activation signals SEN_A-SEN_N), the input 176, the input 180c and/or other inputs.

The outputs 168a-168n, the inputs 170a-170n, the input/output 172, the input 174a, the input 176, the output 174b, the output 178, the output 180a, the output 180b, the input 180c, and/or other inputs/outputs may implement an interface. The interface may be implemented to transfer data to/from the processor 102, the sensors 152a-152n, the communication device 156, the capture devices 104a-104n, the memory 160, the microphones 154a-154n, the speakers 158a-158n and/or other components of the camera system 100i. In one example, the interface may be configured to transmit (e.g., via the outputs 168a-168n) the control signals CTL_A-CTL_N to each of a respective one of the capture devices 104a-104n. In another example, the interface may be configured to receive (e.g., via the inputs 170a-170n) the pixel data signals PIXELD_A-PIXELD_N each from a respective one of the capture devices 104a-104n. In one example, the interface may be configured to receive (e.g., via the input 174a) sensor input from the sensors 152a-152n.

In yet another example, the interface may be configured to receive (e.g., via the input 176) the directional audio DIR_AUD. In still another example, the interface may be configured to transmit encoded video frames (e.g., the signal ENC_VIDEO) and/or the converted data determined based on the computer vision operations to the communication device 156. In another example, the interface may be configured to transmit a notification (e.g., the signal NTF) in response to objects and/or events detected in the captured video data. In yet another example, the interface may be configured to receive the feature set information FEAT_SET (e.g., via the input port 180c) from the communication device 156. In still another example, the interface may be configured to transmit directional audio output (e.g., the signal DIR_AOUT) to each of the speakers 158a-158n. In another example, the interface may be configured to transmit parameter configuration data (e.g., the signals PCT_A-PCT_N) to each of the activation sensors 152a-152n. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal ENC_VIDEO may be presented to the communication device 156. In some embodiments, the signal ENC_VIDEO may comprise encoded video frames generated by the processor 102. In some embodiments, the encoded video frames may comprise a full video stream (e.g., encoded video frames representing all video captured by the capture devices 104a-104n). The encoded video frames may be encoded, cropped, stitched and/or enhanced versions of the pixel data received from the signals PIXELD_A-PIXELD_N. In an example, the encoded video frames may be a high resolution, digital, encoded, dewarped, stabilized, cropped, blended, stitched and/or rolling shutter effect corrected version of the signals PIXELD_A-PIXELD_N.

In some embodiments, the signal ENC_VIDEO may be generated based on video analytics (e.g., computer vision operations) performed by the processor 102 on the video frames generated from the pixel data PIXELD_A-PIXELD_N. The processor 102 may be configured to perform the computer vision operations to detect objects and/or events in the video frames and then convert the detected objects and/or events into statistics and/or parameters. In one example, the data determined by the computer vision operations may be converted to a human-readable format by the processor 102. The data from the computer vision operations may be used to detect objects and/or events to determine when to generate and/or suppress a notification and/or whether to initiate and/or stop video recording/storage. The computer vision operations may be performed by the processor 102 locally (e.g., without communicating to an external device to offload computing operations).

In some embodiments, the signal ENC_VIDEO may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal ENC_VIDEO may be provided to a cloud service for mass storage (e.g., to enable a user to retrieve the encoded video using a smartphone and/or a desktop computer). The type of information communicated by the signal ENC_VIDEO may be varied according to the design criteria of a particular implementation.

The signal NTF may be presented to the communication device 156. The signal NTF may comprise a notification. The notification may be presented to a user. The notification may comprise an indication of events and/or objects detected by the processor 102. The signal NTF may be generated according to an Application Program Interface (API) format to enable the notification to be read by a recipient device (e.g., as a push notification, as a text message, as an email, etc.). The processor 102 may be configured to interpret an event and/or object detected and translate the interpreted event/object into a human recognizable or discernable format (e.g., text, audio, etc.). In some embodiments, the notification may comprise a still image (e.g., a sample video frame). In some embodiments, the notification may be generated in response to input from the sensors 152a-152n (e.g., an indication that motion was detected). While one notification signal NTF is shown, the camera system 100i may generate multiple notifications (e.g., NTF_A-NTF_N) to multiple destination devices. The implementation of the notification signal NTF may be varied according to the design criteria.

The circuit 100i may implement a camera system on chip (SoC). In some embodiments, the camera system 100i may be implemented as a drop-in solution (e.g., installed as one component). In an example, the camera system 100i may be a device that may be installed as an after-market product (e.g., a retro-fit for a drone, a retro-fit for a security system, etc.). In some embodiments, the camera system 100i may be a component of a security system. The number and/or types of signals and/or components implemented by the camera system 100i may be varied according to the design criteria of a particular implementation.

The video data of the targeted view captured by the capture devices 104a-104n may be generated from the signals/bitstreams/data PIXELD_A-PIXELD_N. The capture devices 104a-104n may present the signals PIXELD_A-PIXELD_N to the inputs 170a-170n of the processor 102. The signals PIXELD_A-PIXELD_N may be used by the processor 102 to generate the video frames/video data. In some embodiments, the signals PIXELD_A-PIXELD_N may be video streams captured by the capture devices 104a-104n. In some embodiments, the capture devices 104a-104n may be implemented in the camera system 100i. In some embodiments, the capture devices 104a-104n may be configured to add to existing functionality to the camera system 100i.

Each of the capture devices 104a-104n may comprise a block (or circuit) 182, a block (or circuit) 184, and/or a block (or circuit) 186 (e.g., the circuit 182a, the circuit 184a and the circuit 184n are shown as representative examples for the components of the capture devices 104a-104n). The circuit 182 may implement a camera sensor (e.g., a complementary metal-oxide-semiconductor (CMOS), RGB or RGB-IR sensor). The circuit 184 may implement a camera processor/logic. The circuit 186 may implement a memory buffer. As a representative example, the capture device 104a is shown comprising the sensor 182a, the logic block 184a and the buffer 186a. Similarly, the capture devices 104b-104n may comprise the camera sensors 182b-182n, the logic blocks 184b-184n and the buffers 186b-186n. The sensors 182a-182n may each be configured to receive light from the corresponding one of the lenses 150a-150n and transform the light into digital data (e.g., the bitstreams).

In one example, the sensor 182a of the capture device 104a may receive light from the lens 150a. The camera sensor 182a of the capture device 104a may perform a photoelectric conversion of the light from the lens 150a. In some embodiments, the sensor 182a may be an oversampled binary image sensor. In some embodiments, the camera sensor 182a may comprise an RGB sensor or an RGB-IR sensor. In some embodiments, the camera sensor 182a may comprise a rolling shutter sensor or a global shutter sensor. The logic 184a may transform the bitstream into a human-legible content (e.g., pixel data and/or video data). For example, the logic 184a may receive pure (e.g., raw) data from the camera sensor 182a and generate pixel data based on the raw data (e.g., the bitstream). The memory buffer 186a may store the raw data and/or the processed bitstream. For example, the frame memory and/or buffer 186a may store (e.g., provide temporary storage and/or cache) the pixel data and/or one or more of the video frames (e.g., the video signal).

The microphones 154a-154n may be configured to capture incoming audio and/or provide directional information about the incoming audio. Each of the microphones 154a-154n may receive a respective signal (e.g., AIN_A-AIN_N). The signals AIN_A-AIN_N may be audio signals from the environment near the camera system 100i. For example, the signals AIN_A-AIN_N may be ambient noise in the environment. The microphones 154a-154n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 154a-154n may provide the signal DIR_AUD to the interface 176. The camera system 100i may comprise the interface 176 configured to receive data (e.g., the signal DIR_AUD) from one or more of the microphones 154a-154n. In one example, data from the signal DIR_AUD presented to the interface 176 may be used by the processor 102 to determine the location of the source of the audio input. In another example, the microphones 154a-154n may be configured to determine the location of the audio input and present the location to the interface 176 as the signal DIR_AUD.

The number of microphones 154a-154n may be varied according to the design criteria of a particular implementation. The number of microphones 154a-154n may be selected to provide sufficient directional information about the incoming audio (e.g., the number of microphones 154a-154n implemented may be varied based on the accuracy and/or resolution of directional information acquired). In an example, 2 to 6 of the microphones 154a-154n may be implemented. In some embodiments, an audio processing component may be implemented with the microphones 154a-154n to process and/or encode the incoming audio signals AIN_A-AIN_N. In some embodiments, the processor 102 may be configured with on-chip audio processing to encode the incoming audio signals AIN_A-AIN_N. The microphones 154a-154n may capture audio of the environment 50. The camera system 100i may be configured to synchronize the audio captured with the images captured by the capture devices 104a-104n.

The processor 102 may be configured to execute computer readable code and/or process information. The processor 102 may be configured to receive input and/or present output to the memory 160. The processor 102 may be configured to present and/or receive other signals (not shown). The number and/or types of inputs and/or outputs of the processor 102 may be varied according to the design criteria of a particular implementation.

The processor 102 may receive the signals PIXELD_A-PIXELD_N, the signals SEN_A-SEN_N, the signal DIR_AUD, the signal FEAT_SET and/or the signal DATA. The processor 102 may make a decision based on data received at the inputs 170a-170n, the input 172, the input 174a, the input 176, the input 180c and/or other input. For example, other inputs may comprise external signals generated in response to user input, external activation signals generated by the sensors 152a-152n, the microphones 154a-154n and/or internally generated signals such as signals generated by the processor 102 in response to analysis of the video frames and/or objects detected in the video frames. The processor 102 may adjust the video data (e.g., crop, digitally move, physically move the camera sensors 182a-182n, etc.) of the video frames. The processor 102 may generate the control signals CTL_A-CTL_N, the parameter control signals PCT_A-PCT_N, the signal ENC_VIDEO and/or the signal DIR_AOUT in response to data received by the inputs 170a-170n, the input 172, the input 174a, the input 176, the input 180c and/or the decisions made in response to the data received by the inputs 170a-170n, the input 172, the input 174a, the input 176 and/or the input 180c. The various operations performed by the processor 102 may be performed locally (e.g., using the internal components of the camera 100i rather than offloading computing operations to external resources such as a cloud service).

The signal ENC_VIDEO, the signal NTF, the signals PCT_A-PCT_N and/or the signal DIR_AOUT may be generated to provide an output in response to the captured video frames, the video encoding and/or the video analytics performed by the processor 102. For example, the video analytics may be performed by the processor 102 in real-time and/or near real-time (e.g., with minimal delay).

The cropping, downscaling, blending, stabilization, packetization, encoding, compression and/or conversion performed by the processor 102 may be varied according to the design criteria of a particular implementation. For example, the video frames generated by the processor 102 may be a processed version of the signals PIXELD_A-PIXELD_N configured to enable detection of the objects and/or determination of the characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 104a-104n. For example, the video frames may comprise a portion of the panoramic video captured by the capture devices 104a-104n. In another example, the video frames may comprise a region of interest selected and/or cropped from the panoramic video frame by the processor 102 (e.g., upscaled, oversampled and/or digitally zoomed) to enable a high precision of object detection. In some embodiments, the video frames may provide a series of cropped and/or enhanced video frames that improve upon the view from the perspective of the camera system 100i (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The memory 160 may store data. The memory 160 may be implemented as a cache, flash memory, DRAM memory, etc. The type and/or size of the memory 160 may be varied according to the design criteria of a particular implementation. The data stored in the memory 160 may correspond to a video file, user profiles, user permissions, a feature set, types of objects/events of interest, information about the configuration of the lenses 150a-150n, manual settings and/or schedules for the operating parameters of the activation sensors 152a-152n, etc.

The battery 162 may be configured to provide power to the components of the camera 100i. The battery 162 may enable the camera 100i to operate without continual access to an external power supply. In an example, the battery 162 may comprise a lithium-ion type of battery. In another example, the battery 162 may comprise a supercapacitor. The type of battery 162 implemented may be varied according to the design criteria of a particular implementation.

The lenses 150a-150n (e.g., camera lenses) may be directed to provide a panoramic view from the camera system 100i. The lenses 150a-150n may be aimed to capture environmental data (e.g., light). The lens 150a-150n may be configured to capture and/or focus the light for the capture devices 104a-104n. Generally, the camera sensors 182a-182n may be located behind each of the respective lenses 150a-150n. Based on the captured light from the lenses 150a-150n, the capture devices 104a-104n may generate a bitstream and/or raw pixel data.

Embodiments of the processor 102 may perform video stitching operations on the signals PIXELD_A-PIXELD_N. In one example, each of the pixel data signals PIXELD_A-PIXELD_N may provide a portion of a panoramic view and the processor 102 may crop, blend, synchronize and/or align the pixel data from the signals PIXELD_A-PIXELD_N to generate the panoramic video frames. In some embodiments, the processor 102 may be configured to perform electronic image stabilization (EIS). The processor 102 may perform de-warping on the video frames. The processor 102 may perform intelligent video analytics on the de-warped video frames. The processor 102 discard the video frames after the video analytics and/or computer vision has been performed.

The encoded video frames may be processed locally. In one example, the encoded, panoramic video may be stored locally by the memory 160 to enable the processor 102 to facilitate the computer vision analysis internally (e.g., without first uploading video frames to a cloud service). The processor 102 may be configured to select the video frames to be encoded for the output video.

The processor 102 may receive an input to generate the video frames (e.g., the signals PIXELD_A-PIXELD_N) from the CMOS sensor(s) 182a-182n. The pixel data signals PIXELD_A-PIXELD_N may be enhanced by the processor 102 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100i may be used to generate panoramic video such as a spherical video, a hemispherical video, a 360 degree video, a wide angle video, a video having less than a 360 field of view, etc.

Panoramic videos may comprise a view of the environment near the camera system 100i. In one example, the entire field of view of the panoramic video may be captured at generally the same time (e.g., each portion of the panoramic video represents the view from the camera system 100i at one particular moment in time). In some embodiments (e.g., when the camera system 100i implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100i.

In some embodiments, the field of view may provide coverage for a full 360 degree field of view. In some embodiments, less than a 360 degree view may be captured by the camera system 100i (e.g., a 270 degree field of view, a 180 degree field of view, etc.). In some embodiments, the panoramic video may comprise a spherical field of view (e.g., capture video above and below the camera system 100i). For example, the camera system 100i may be mounted on a ceiling and capture a spherical field of view of the area below the camera system 100i. In some embodiments, the panoramic video may comprise a field of view that is less than a spherical field of view (e.g., the camera system 100i may be configured to capture the ground below and the areas to the sides of the camera system 100i but nothing directly above). The implementation of the camera system 100i and/or the captured field of view may be varied according to the design criteria of a particular implementation.

In embodiments implementing multiple lenses, each of the lenses 150a-150n may be directed towards one particular direction to provide coverage for a full 360 degree field of view. In embodiments implementing a single wide angle (e.g., fish eye) lens (e.g., the lens 150a), the lens 150a may be located to provide coverage for the full 360 degree field of view (e.g., on the bottom of the camera system 100i in a ceiling mounted embodiment, on the bottom of a drone camera, etc.). In some embodiments, less than a 360 degree view may be captured by the lenses 150a-150n (e.g., a 270 degree field of view, a 180 degree field of view, etc.). In some embodiments, the lenses 150a-150n may move (e.g., the direction of the capture devices may be controllable). In some embodiments, one or more of the lenses 150a-150n may be configured to implement an optical zoom (e.g., the lenses 150a-150n may zoom in/out independent of each other).

In some embodiments, the camera system 100i may be implemented as a system on chip (SoC). For example, the camera system 100i may be implemented as a printed circuit board comprising one or more components (e.g., the capture devices 104a-104n, the processor 102, the activation sensors 152a-152n, the communication device 156, the memory 160, etc.). The camera system 100i may be configured to perform intelligent video analysis on the video frames of the video. The camera system 100i may be configured to crop and/or enhance the video.

In some embodiments, the processor 102 may be configured to perform sensor fusion operations. The sensor fusion operations performed by the processor 102 may be configured to analyze information from multiple sources (e.g., the capture devices 104a-104n, the activation sensors 152a-152n and the microphones 154a-154n). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from the directional audio DIR_AUD. In another example, the sensor fusion operations implemented by the processor 102 may analyze video (e.g., to detect and/or classify objects) as well as the motion information from the activation signals SEN_A-SEN_N. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data, that may be unavailable to the camera system 100*i*. However, the computer vision operations performed using the feature set may be performed using the computational resources of the processor 102 within the camera system 100*i*.

The signal DIR_AOUT may be an audio output. For example, the processor 102 may generate output audio based on information extracted from the video frames PIXELD_A-PIXELD_N. The signal DIR_AOUT may be determined based on an event and/or objects determined using the computer vision operations. In one example, the signal DIR_AOUT may comprise an audio message for people detected. In some embodiments, the signal DIR_AOUT may not be generated until an event has been detected by the processor 102 using the computer vision operations.

The signal DIR_AOUT may comprise directional and/or positional audio output information for the speakers 158*a*-158*n*. The speakers 158*a*-158*n* may receive the signal DIR_AOUT, process the directional and/or positional information and determine which speakers and/or which channels will play back particular audio portions of the signal DIR_AOUT. The speakers 158*a*-158*n* may generate the signals AOUT_A-AOUT_N in response to the signal DIR_AOUT. The signals AOUT_A-AOUT_N may be the audio message played. For example, the speakers 158*a*-158*n* may emit a pre-recorded message in response to a detected event. The signal DIR_AOUT may be a signal generated in a format that provides directional information for the signals AOUT_A-AOUT_N.

The number of speakers 158*a*-158*n* may be varied according to the design criteria of a particular implementation. The number of speakers 158*a*-158*n* may be selected to provide sufficient directional channels for the outgoing audio (e.g., the number of speakers 158*a*-158*n* implemented may be varied based on the accuracy and/or resolution of directional audio output). In an example, 1 to 6 of the speakers 158*a*-158*n* may be implemented. In some embodiments, an audio processing component may be implemented by the speakers 158*a*-158*n* to process and/or decode the output audio signals DIR_AOUT. In some embodiments, the processor 102 may be configured with on-chip audio processing. In some embodiments, the signal DIR_AOUT may playback audio received from remote devices (e.g., smartphones) in order to implement a 2-way real-time audio communication.

The video pipeline of the processor 102 may be configured to locally perform de-warping, cropping, enhancements, rolling shutter corrections, stabilizing, downscaling, packetizing, compression, conversion, blending, synchronizing and/or other video operations. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the processor 102 may be varied according to the design criteria of a particular implementation.

The sensors 182*a*-182*n* may each implement a high-resolution sensor. Using the high resolution sensors 182*a*-182*n*, the processor 102 may combine over-sampling of the image sensors 182*a*-182*n* with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, one or more of the lenses 150*a*-150*n* may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., the directional microphones 154*a*-154*n* may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensors 182*a*-182*n*. The over-sampling of the image sensors 182*a*-182*n* may result in a higher resolution image.

The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture devices 104a-104n). In an example, the dewarping may alter the video data to generate a rectilinear video frame (e.g., correct artifacts caused by the lens characteristics of the lenses 150a-150n). The dewarping operations may be implemented to correct the distortion caused by the lenses 150a-150n. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n and/or other components of the camera system 100i may be described in association with U.S. patent application Ser. No. 15/931,942, filed May 14, 2020, U.S. patent application Ser. No. 16/831,549, filed on Mar. 26, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera 100i.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT_SET. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, a vehicle, a tree, etc.) and/or characteristics of the object (e.g., a mouth of a person, a hand of a person, a screen of a television set, an armrest of a couch, a clock, a branch of a tree, etc.). Implementing the CNN module 190b as a dedicated hardware module of the processor 102 may enable the camera system 100i to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of objects to match against (e.g., reference objects) may be customized using an open operand stack (enabling programmability of the processor 102 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 150a-150n may represent one coordinate (e.g., a location coordinate on a third axis) for a depth location of the body part in 3D space. Using the location of various body parts in 3D space, the processor 102 may determine body position, and/or body characteristics of the people 70a-70n.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One of the hardware modules 190a-190n (e.g., 190c) may implement an audio analysis module. The audio analysis module 190c may be configured to perform audio analytics on audio received by the microphones 154a-154n. For example, the microphones 154a-154n may receive the signal DIR_AUD and the audio analysis module 190c may perform audio analytics on the signal DIR_AUD received at the input port 176.

The audio analytics performed by the audio analysis module 190c may comprise detecting a frequency and/or frequency range of input audio, determining a frequency signature, detecting an amplitude of the input audio, performing voice recognition, etc. Detecting the frequency signature of the input audio may enable the audio analysis module 190c to compare the frequency signature of the input audio to stored frequency signatures. Comparing the frequency signatures may enable the audio analysis module 190c to determine a match between the input audio and the stored audio (e.g., determine whether the input audio was spoken by a person that is the same age and/or gender as the stored audio, determine whether the input audio was spoken by the same person as the stored audio, perform voice recognition, etc.).

In some embodiments, the audio analysis module 190c may be configured to parse the input audio to determine the content of the input audio. In one example, the audio analysis module 190c may be configured to perform speech-to-text operations to generate a transcript of the input audio. In another example, the audio analysis module 190c may be configured to interpret the parsed audio to understand and/or react to the input audio. For example, the audio analysis module 190c may understand that the input audio comprising the word "yes" is an affirmative response. In another example, the audio analysis module 190c may be configured to understand that the input audio comprises a name and match the name to a stored name. In yet another example, the audio analysis module 190c may be configured to recognize a particular word (or passphrase) as a command, and perform the command in response to detecting the particular word. The type of audio analytics performed by the audio analysis module 190c may be varied according to the design criteria of a particular implementation.

One of the hardware modules 190a-190n (e.g., 190d) may implement an activation sensor control module. The activation sensor control module 190d may be configured to perform analytics on the activation signals SEN_A-SEN_N generated by the activation sensors 152a-152n. The activation sensor control module 190d may be configured to store the various activation parameters for each of the activation sensors 152a-152n. The activation control module 190d may be configured to manage the activation parameters for each of the activation sensors 152a-152n individually. For example, the activation control module 190d may track which of the activation sensors 152a-152n are currently disabled and/or the amount of time remaining for the disabled status in response to objects detected using the computer vision operations (e.g., false positives detected). The activation sensor control module 190d may be configured to compare motion detected by the activation sensors 152a-152n with the objects detected and/or classified by the computer vision operations in order to determine whether to adjust and/or the amount to adjust for a sensitivity threshold for the activation sensors 152a-152n.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
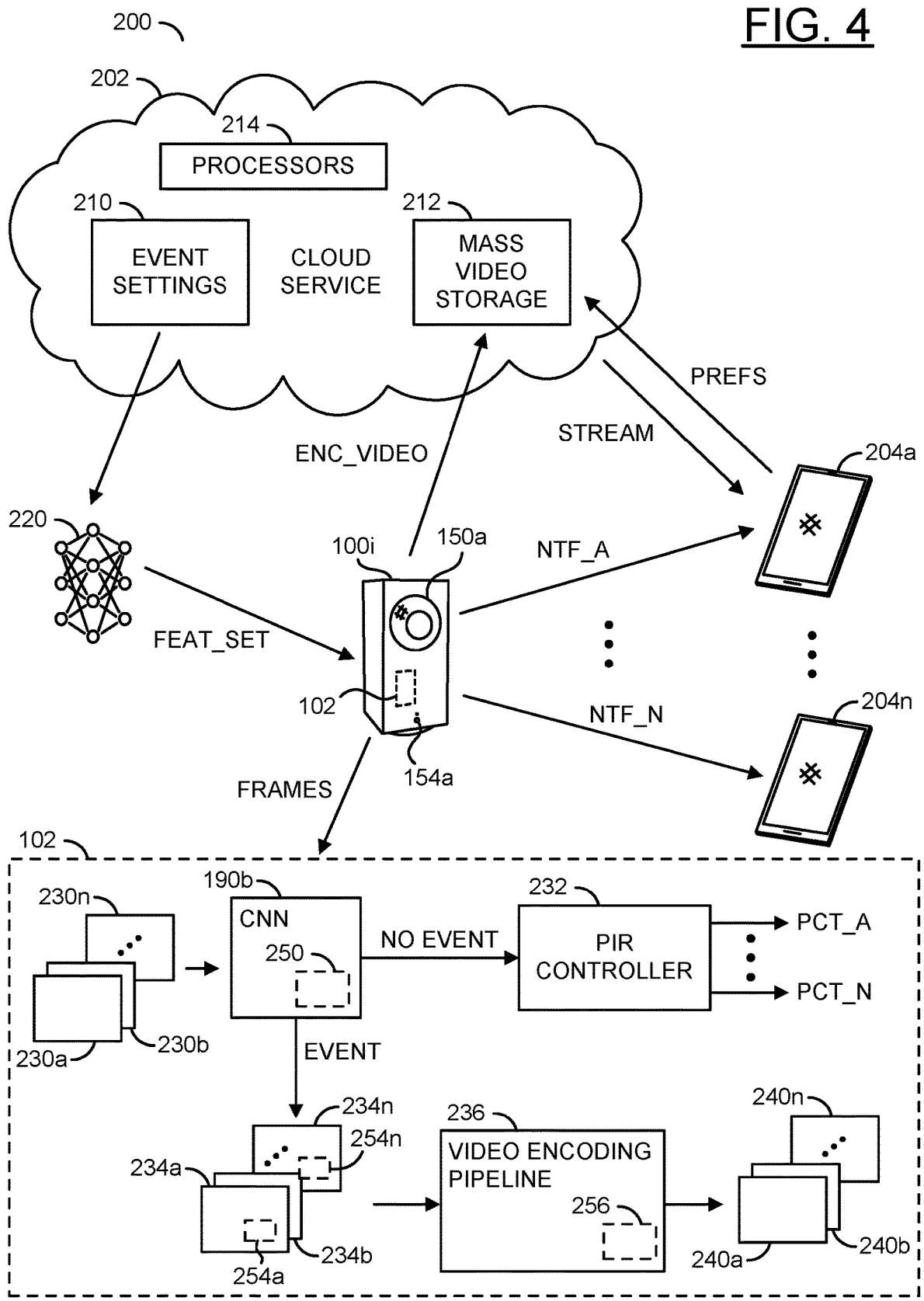
FIG. 4 is a diagram illustrating an interconnected camera receiving feature set information and dynamically calibrating sensor parameters.

Referring to FIG. 4 is a diagram illustrating an interconnected camera receiving feature set information and dynamically calibrating sensor parameters. An example scenario 200 is shown. The example scenario 200 may comprise the camera system 100i, a server 202 and/or remote devices 204a-204n. The lens 150a and the microphone 154a are shown on the camera system 100i. The processor 102 is shown within the camera system 100i. The example scenario 200 may further comprise a visualization of the processor 102 and/or a machine readable version of a DAG 220.

The server 202 may implement a cloud service. The cloud service 202 may comprise a block (or module) 210, a block (or module) 212 and/or a block (or module) 214. The module 210 may implement event settings storage. The module 212 may implement mass video storage. The event settings storage 210 and/or the mass video storage 212 may be implemented using one or more types of memory implemented by the cloud service 202. The module 214 may implement one or more processors. The cloud service 202 may comprise other components (not shown). The number, type and/or arrangement of the components of the cloud service 202 may be varied according to the design criteria of a particular implementation.

The cloud service 202 may be implemented as part of a cloud computing platform (e.g., distributed computing). In an example, the cloud service 202 may be implemented as a group of cloud-based, scalable server computers. By implementing a number of scalable servers, additional resources (e.g., power, processing capability, memory, etc.) may be available to process and/or store variable amounts of data. For example, the cloud service 202 may be configured to scale (e.g., provision resources) based on demand. The cloud service 202 may implement scalable computing (e.g., cloud computing). The scalable computing may be available as a service to allow access to processing and/or storage resources without having to build infrastructure.

In some embodiments, the cloud service 202 may be configured to provide resources such as training data and/or a database of feature maps (e.g., feature maps of recognized objects that may be used as a basis to perform object recognition and/or classification). Generating the feature maps may be performed by the cloud service 202 since the cloud service 202 may have access to a large amount of training data (e.g., all the video frames uploaded by the cameras 100a-100n and/or other devices). Feature maps and/or training data may be stored in the event settings storage 210. The event settings storage 210 may be configured to provide a feature set to the camera system 100i in response to the particular events and/or objects selected for detection. In one example, individual users may select different types of events and/or objects to detect (e.g., objects of interest). For example, the objects of interest may be particular people (e.g., faces of people). In some embodiments, the feature maps and/or training data may comprise undesired objects. The undesired objects may be various objects that may result in false positives by the activation sensors 152a-152n. For example, the undesired objects may comprise tree branches, leaves, small animals (e.g., squirrels, birds, etc.), etc. The types of feature sets provided to the camera system 100i may be varied depending on the objects of interest selected by each user.

In some embodiments, the cloud service 202 may be configured to provide storage resources. The mass video storage 212 may be configured to provide long-term storage of video data. For example, the cloud service 202 may comprise storage resources (e.g., hard drives, solid state drives, etc.) that enable considerably more storage capacity than available internally on the camera system 100i.

The cloud service 202 may have access to considerably more bandwidth capacity than the camera system 100i. The bandwidth capacity available to the cloud service 202 may enable the cloud service 202 to stream video to the remote devices 204a-204n. A signal (e.g., STREAM) is shown. The signal STREAM may represent streaming video communicated to one or more of the remote devices 204a-204n.

The remote devices 204a-204n may be various user devices. In the example shown, the remote devices 204a-204n may be smartphones. In another example, the remote devices 204a-204n may be desktop computers, laptop computers, tablet computing devices, smartwatches, etc. The types of remote devices 204a-204n implemented may be varied according to the design criteria of a particular implementation.

The remote devices 204a-204n may enable end users to communicate with the camera systems 100a-100n and/or the cloud service 202. In one example, a companion application may be configured to operate on the remote devices 204a-204n. The companion application may enable users to adjust settings of the camera systems 100a-100n. The companion application may enable users to view video captured by the camera systems 100a-100n (e.g., directly from the camera systems 100a-100n and/or streamed via the cloud service 202). For example, the remote devices 204a-204n may be configured to receive the signal STREAM and playback the video stream to the end user.

A signal (e.g., PREFS) is shown. The signal PREFS may provide user preferences to the cloud service 202. In an example, the companion app implemented on the remote devices 204a-204n may enable the end users to adjust various settings for the camera systems 100a-100n and/or the video captured by the camera systems 100a-100n. In some embodiments, the settings may be stored in the cloud service 202 as the event settings storage 210 (e.g., using a secured account). The signal PREFS may comprise the objects and/or events of interest selected by the user. In one example, the signal PREFS may enable the user to select people and animals as the objects and/or events of interest. The signal PREFS may enable the user to configure whether or not to suppress notifications based on faces and/or people recognized using the computer vision operations. The signal PREFS may enable the end user to configure the types and/or amounts of adjustments (e.g., range, sensitivity, amount of time to disable, etc.) to the configuration parameters of the activation sensors 152a-152n to perform in response to various classifications of objects. The data from the signal PREFS may be stored in the event settings storage 210.

The edge AI camera 100i may be configured to communicate with the remote cloud service 202 and/or the user devices (e.g., smartphones) 204a-204n. The edge AI camera 100i may be a representative example of any of the camera systems 100a-100n. The edge AI camera 100i is shown communicating the signal ENC_VIDEO, a signal (e.g., FRAMES) and/or one or more of the signals NTF_A-NTF_N. The edge AI camera 100i is shown receiving the signal FEAT_SET. The signal FRAMES may comprise video frames generated by the processor 102 in response to the pixel data PIXELD_A-PIXELD_N. The signals NTF_A-NTF_N may be notification signals communicated to the remote devices 204a-204n. The edge AI camera 100i may be configured to communicate and/or generate other signals (not shown). The number, type and/or format of the signals communicated and/or generated by the edge AI camera 100i may be varied according to the design criteria of a particular implementation.

The edge AI camera 100i may be configured to upload the encoded video frames ENC_VIDEO to the cloud service 202 and/or the remote devices 204a-204n. The edge AI camera 100i may encode the video frames before uploading to limit an amount of bandwidth consumed compared to uploading unencoded video frames. In some embodiments, the encoded video frames ENC_VIDEO may comprise all of the video data generated by the edge AI camera 100i. In some embodiments, the encoded video frames ENC_VIDEO may comprise video clips and/or still images generated internally by the edge AI camera 100i.

The signals NTF_A-NTF_N may comprise notifications that may be accessed using the remote devices 204a-204n. In one example, the notification signals NTF_A-NTF_N may provide a message that a particular object and/or event has been detected. For example, the notification may comprise a text message such as, "A person has been detected at 2:54 pm" and a link to the video comprising the corresponding object and/or event. In the example shown, the notification signals NTF_A-NTF_N may be generated by the edge AI camera 100i (e.g., direct communication between the camera system 100i and the remote devices 204a-204n). In some embodiments, the signals NTF_A-NTF_N may be combined with the signal ENC_VIDEO (e.g., the video stream may be sent directly from the edge AI camera 100i to one or more of the remote devices 204a-204n along with the notification).

In some embodiments, the notification signals NTF_A-NTF_N may be generated by the cloud service 202. For example, the edge AI camera 100i may be configured to tag the video frames with metadata about the particular objects detected. The cloud service 202 may compare the metadata in the video frames uploaded to the cloud service 202 with the event settings storage 210. When the cloud service 202 detects a match between the metadata in the video frames and the event settings for a particular user, the cloud service 202 may communicate one of the signals NTF_A-NTF_N to the appropriate one of the remote devices 204a-204n. In an example, the cloud server 202 may securely store the contact information for the owners of the smartphones 204a-204n (e.g., user information about registered users).

The machine readable DAG 220 of the event settings 210 is shown. The machine readable DAG 220 may comprise a neural network and/or computer readable instructions that define the types of objects and/or events that may be detected by the processor 102 of the camera system 100*i*. For example, the machine readable DAG 220 may be generated according to an API (e.g., a format) compatible with the camera system 100*i*. The machine readable DAG 220 may comprise one or more neural networks (e.g., each neural network may correspond to various types of objects to detect based on the event settings 210). The machine readable DAG 220 may be provided to the camera system 100*i* in the signal FEAT_SET.

The camera system 100*i* may receive the signal FEAT_SET from the cloud service 202. The processor 102 may convert the feature set information in the signal FEAT_SET to detection parameters. The camera system 100*i* may capture pixel data and generate the video frames from the pixel data PIXELD_A-PIXELD_N. The camera system 100*i* is shown generating the signal FRAMES. The signal FRAMES may comprise the video frames generated by the processor 102. The signal FRAMES may comprise data used internally by the processor 102. In an example, the signal FRAMES (e.g., unencoded video frames) may not be communicated from the camera system 100*i*.

The user may select settings using an app on the smartphones 204*a*-204*n* (e.g., the signal PREFS). The preferences may be stored as the event settings 210 in the cloud service 202. The cloud service 202 may be configured to provide neural network parameters (e.g., the feature set) for the processor 102 in response to the event settings 210 for a particular user (e.g., the signal FEAT_SET). The processor 102 may receive the feature set to detect objects/events. The edge AI camera 100*i* may be configured to upload the encoded video frames (e.g., a full video stream and/or a timelapse video) to the cloud service 202. The encoded video frames ENC_VIDEO may be stored in the mass video storage 212 of the cloud service 202. The user may access the encoded video frames using the smartphones 204*a*-204*n*. In an example, the smartphones 204*a*-204*n* may connect to the mass video storage 212 and download the video streams. The cloud service 202 and/or the edge AI camera 100*i* may further provide notifications (e.g., the signals NTF_A-NTF_N) to the smartphones 204*a*-204*n* based on content in the metadata tags of the uploaded video.

In some embodiments, the feature set data (or training data that may be used by the processor 102 to generate the feature set data) may be sent directly from the remote devices 204*a*-204*n*. For example, images of particular people may be communicated via a local network in order to protect a privacy of people and/or faces of people that may be communicated (e.g., to generate feature set data).

In an example, the companion app implemented on the remote devices 204*a*-204*n* may enable the end users to adjust various settings for the camera systems 100*a*-100*n* and/or the video captured by the camera systems 100*a*-100*n*. In some embodiments, the settings may be stored in the cloud service 202 as part of the event settings storage 210 (e.g., using a secured account). However, in some embodiments, to ensure privacy protection, the settings may instead avoid communication to/from the cloud service 202. For example, a direct connection and/or a communication that does not transfer data to the cloud service 202 may be established between one or more of the remote devices 204*a*-204*n* and the edge AI camera 100*i*.

The faces and/or identities of various people that may be selected by the user. The user may select people (e.g., faces) as privacy events. In one example, the user may select people (e.g., faces) to enable the processor 102 to distinguish between people that are considered privacy events and people that are not considered privacy events. For example, the user may select settings using an app on the smartphones 204*a*-204*n* and the preferences may be communicated directly to the edge AI camera 100*i* (e.g., to prevent faces from being stored in the cloud service 202). For example, there may be no concern of leaking family privacy information (e.g., video and/or images of family members and/or the behavior of family members) because the faces of the family members may be enrolled locally using the app on the remote devices 204*a*-204*n* and the feature set generated from the enrolled faces may be sent via a local network rather than through the cloud service 202.

A video processing pipeline of the processor 102 is shown. The video processing pipeline of the processor 102 may comprise the CNN module 190*b*, raw video frames 230*a*-230*n*, a block (or circuit) 232, tagged video frames 234*a*-234*n*, a block (or circuit) 236 and/or encoded video frames 240*a*-240*n*. The circuit 232 may implement a PIR controller. The circuit 236 may implement a video encoding pipeline. The PIR controller 232 and/or the video processing pipeline may be implemented using one or more of the hardware modules 190*a*-190*n*. In an example, the PIR controller 232 may be an implementation of the activation sensor control module 190*d* described in association with FIG. 3. The video processing pipeline of the processor 102 may comprise other components and/or data (not shown). The number, type and/or arrangement of the components and/or data in the video processing pipeline of the processor 102 may be varied according to the design criteria of a particular implementation.

The processor 102 may generate raw video frames 230*a*-230*n* in response to the pixel data captured by the capture devices 104*a*-104*n*. For example, the raw video frames 230*a*-230*n* may be the data in the signal FRAMES. The raw video frames 230*a*-230*n* may be analyzed by the CNN module 190*b*. The CNN module 190*b* may comprise a block (or circuit) 250. The block 250 may comprise an AI model (e.g., the DAG). The CNN module 190*b* may be configured to detect objects and/or events of interest and/or identities based on the preferences of the user (e.g., detect one or all of people, vehicles, animals, movement, sound, etc. as an event and/or detect various faces to identify particular individuals). Similarly, the CNN module 190*b* may be configured to detect false positive events (e.g., undesired events) based on the preferences of the user (e.g., particular individuals, small animals, tree branches, leaves, etc.). The AI model 250 may be configured to implement the machine readable DAG 220 to detect various objects, events, various identities and/or faces (e.g., to determine events of interest and/or false positive events).

The CNN module 190*b* may be configured to tag the video frames 230*a*-230*n* when an event and/or particular person is detected (e.g., an object of interest). The CNN module 190*b* may be configured to determine which of the video frames 230*a*-230*n* have no event detected (e.g., an undesired object is detected, a particular person and/or object of interest is not detected). The tagged video frames 234*a*-234*n* are shown representing the video frames 230*a*-230*n* after being analyzed by the CNN module 190*b*. One or more of the tagged video frames 234*a*-234*n* may comprise video data that corresponds to objects of interest. In some embodiments, the tagged video frames 234*a*-234*n* may comprise the video data that corresponds to the undesired objects (e.g., video that is recorded during a false positive detection from the activation sensors 152a-152n may still be recorded, analyzed, tagged and/or encoded).

The CNN module 190b may be configured to perform object detection, classify objects, and/or extract data from the video frames 230a-230n. The CNN module 190b may compare the data extracted (e.g., various symbols and/or confidence values indicating the likelihood that particular objects were detected) with the detection parameters (e.g., the feature set information) of the signal FEAT_SET according to the machine readable DAG 220 (e.g., the data corresponding to the various classifications of objects) to determine whether or not one of the objects of interest or a false positive has been detected. In an example, the feature set signal FEAT_SET may provide instructions to detect objects of interest and/or undesired objects and the camera system 100i may use the detection parameters to monitor whether one or more of the objects of interest and/or the undesired objects have been detected in the video frames 230a-230n.

In some embodiments, the CNN module 190b and/or audio analytics module 190c may determine when one of the objects of interest and/or the undesired objects has been detected. For example, the detection of a particular person, a vehicle and/or an animal may comprise an amplitude and/or type of audio detected and/or a combination of audio and video analysis (e.g., using computer vision to detect a person and using audio analysis to determine if the person is making a lot of noise). For example, audio characteristics (e.g., voice frequencies, voice timbre and/or keywords) may be used by the audio analysis module 190c to identify whether one of the desired objects and/or undesired objects are within the field of view of the lens 150a.

The CNN module 190b may compare the data extracted (e.g., various symbols and/or confidence values indicating the likelihood that particular people were detected) with the detection parameters (e.g., the feature set information) to determine whether or not a particular class of object has been detected. In an example, the feature set signal FEAT_SET may provide instructions to detect when a family member of the user is detected and the camera system 100i may use the detection parameters to monitor whether the family member has been detected in the video frames 230a-230n. Similarly, the audio analysis module 190c may perform audio analytics in response to audio data stored for the objects of interest and/or the undesired objects. In one example, the signal FEAT_SET may comprise feature set data that corresponds to audio data. In some embodiments, the CNN module 190b and/or audio analytics module 190c may determine when a particular person has been detected. For example, the identification of a particular person may comprise a particular audio frequency (e.g., a vocal signature) of a particular person. The feature set information stored in the AI model 250 may be used to enable the CNN module 190b to distinguish between individuals that should have privacy protection (e.g., pre-defined individuals such as family members, friends, etc.) and other individuals that should be detected as events of interest (e.g., strangers, potential criminals, solicitors, visitors, etc.).

The PIR controller 232 may be configured to generate one or more of the parameter configuration signals PCT_A-PCT_N in response to the CNN module 190b determining that no event (or object of interest) has been detected. The PIR controller 232 may be configured to generate the parameter configuration signals PCT_A-PCT_N independently for each of the activation sensors 152a-152n. For example, the parameter configuration for each of the activation sensors 152a-152n may be independently controlled.

The CNN module 190b may be configured to detect objects, classify the objects and/or provide an indication of a location of the various objects in the video frames 230a-230n. In an example, the object location may comprise an X,Y coordinate for abounding box used to identify the size and/or shape of the detected objects. The PIR controller 232 may be configured to store range and/or directional information for the activation sensors 152a-152n. The range and/or directional information may comprise a correlation between a detection range of each of the activation sensors 152a-152n and the field of view of the capture devices 104a-104n. The PIR controller 232 may be configured to receive the location information of the detected objects and compare the location of the objects with the detection range of each of the activation sensors 152a-152n. The comparison of the location of the detected objects and the detection range of each of the activation sensors 152a-152n may enable the PIR controller 232 to determine which of the activation sensors 152a-152n may have generated the activation signals SEN_A-SEN_N for each of the objects detected.

The PIR controller 232 may determine which of the objects detected by the CNN module 190b are in the detection ranges of which of the activation sensors 152a-152n. Determining which of the activation sensors 152a-152n detected which object may enable the PIR controller 232 to determine which of the activation sensors 152a-152n was triggered in response to an object of interest and which of the activation sensors 152a-152n was triggered in response to an undesired object (e.g., a false positive). The PIR controller 232 may be configured to determine which of the detection parameters to adjust and/or the type/amount of adjustment to perform for each of the activation sensors 152a-152n based on the class of the objects detected and/or the location of the objects detected.

The parameter control signals PCT_A-PCT_N may be generated in response to the decisions made by the PIR controller 232. In an example, if an undesired object has been detected in the detection range of the activation sensor 152c at a distance far away from the activation sensor 152c, the PIR controller 232 may generate the parameter control signal PCT_C comprising parameter adjustments that may reduce a detection range for the activation sensor 152c. In another example, if an undesired object has been detected in the detection range of the activation sensor 152a at a close range, the PIR controller 232 may generate the parameter control signal PCT_A comprising parameter adjustments that disable the activation sensor 152a for a particular amount of time. The PIR controller 232 may track the time for disabling the activation sensor 152a and then generate the parameter control signal PCT_A comprising parameter adjustments that re-enable the activation sensor 152a after the particular amount of time has elapsed. The types of adjustments made by the PIR controller 232 may be varied according to the design criteria of a particular implementation.

The tagged video frames 234a-234n may comprise respective metadata tags 254a-254n. The metadata tags 254a-254n may comprise labels that indicate the objects, characteristics, identities, faces and/or events detected by the CNN module 190b and/or a timestamp indicating when (or in which order) the video frames were captured. In some embodiments, the metadata tags 254a-254n may be used to generate training data (e.g., the metadata tags 254a-254n may be tagged as correct or incorrect and/or as an object of interest or a false positive based on whether the metadata tags 254a-254n accurately identify and/or classify the objects, events and/or characteristics). The training data may be used to refine the feature set used to detect objects and/or identities (e.g., to adjust neural network weight values and/or bias values for the AI model 250).

The tagged video frames 234a-234n may be provided to the video encoding pipeline 236. The tagged video frames 234a-234n may be encoded at a particular frame rate and/or in a particular format (e.g., compressed and/or transcoded). The video encoding pipeline 236 may be configured to encode video frames in real time (e.g., HEVC, AVC, H264, etc.). The video encoding pipeline 236 may be configured to generate the encoded video frames 240a-240n. The encoded video frames 240a-240n may be the communicated to the cloud service 202 and/or one or more of the remote devices 204a-204n. The encoded video frames 240a-240n may be stored locally on the camera device 100i (e.g., in the memory 160 and/or an expansion storage such as a microSD card).

The video encoding pipeline 236 may comprise a block (or module) 256. The module 256 may be configured to apply various effects to the tagged video frames 234a-234n. For example, the module 256 may be configured to crop the selected video frames, dewarp the selected video frames, apply colorization (or remove color) from the selected video frames, apply blurs to sections of the video frames, etc. In an example, a blur effect may be applied to portions of the selected video frames to hide and/or censor particular objects (e.g., hide the identity of a known person for privacy reasons, hide naked body parts to prevent nudity from being uploaded, etc.).

The video encoding pipeline 236 and/or the module 256 may determine when and/or where to apply the obscure effect (e.g., a blur) to the tagged video frames 234a-234n based on the metadata 254a-254n (e.g., indicating that a particular person and/or particular characteristics have been detected). The distortion effect may be applied to the location of the pre-defined identity (e.g., the face of the person). In an example, the metadata tags 254a-254n may comprise a location of the face of one of people identified to enable the module 256 to apply the distortion effect only where the pre-defined identity is located (e.g., to ensure other people may be identified).

The distortion effect applied by the module 256 may be configured to ensure the privacy of the particular person (e.g., hide the identity of the person). The distortion effect may be a trade-off between including additional video data (e.g., including the video frames instead of excluding the video frames altogether or stopping recording) and preserving the privacy of pre-defined people. In one example, the distortion effect may be a blur effect applied to the location of the face of the person. In another example, the distortion effect may be a mosaic effect applied to the location of the face of the person. In yet another example, the distortion effect may be an alternate graphic applied to the face of the person (e.g., replacing the face of the person with a cartoon dog). In still another example, body parts of the person other than the face may be distorted. After applying the distortion effect to the tagged video frames 234a-234n, the encoded video frames 240a-240n may be output. The type and/or amount of the distortion effect applied by the module 256 may be varied according to the design criteria of a particular implementation.

The processor 102 may be configured to perform the computer vision operations before the video frames 230a-230n are encoded. Performing the computer vision operations before the video frames 230a-230n are encoded may enable the computer vision operations to be performed without the cycle cost of first decoding the video frames. For example, if the computer vision is performed by the cloud service 202, the encoded video frames 240a-240n are sent to the cloud servers 202 and the cloud server 202 wastes CPU cycles and power by first decoding the encoded video frames 240a-240n, and then performing the computer vision operations and then transcoding the video stream for communication device the remote devices 204a-204n. Furthermore, sending the video frames 230a-230n to the cloud service 202 to perform the computer vision operations would compromise the privacy of the pre-defined identities.

The processor 102 may be configured to perform the detection of the various classes of objects (e.g., objects of interest, false positive objects, etc.) in the video frames 230a-230n entirely local to the edge AI camera 100i. The processor 102 may implement the CNN module 190b. The CNN module 190b may be a hardware component (or multiple hardware components working together) of the processor 102 that implements CNN-based detection techniques (or other types of detection techniques) that operate entirely on the processor 102 to perform computer vision operations such as object detection, object tracking, object classification, facial recognition, etc. The hardware accelerated CNN module 190b may enable the object/event detection to be performed on the camera system 100i (e.g., without relying on computing resources of the cloud server 202 to perform object detection).

In some embodiments, the processor 102 may use software acceleration for computer vision and/or a combination of hardware accelerated and software accelerated computer vision. With computer vision operations running on either a hardware based CNN engine 190b and/or a software based CNN engine, the processor 102 implemented in the edge device 100i may be able to detect events of one or more types, and apply the metadata tags 254a-254n to the video frames captured.

The processor 102 may be configured to generate the encoded video frames 240a-240n from the pixel data received from the capture devices 104a-104n. The processor 102 may be configured to determine when the configuration parameters of the activation sensors 152a-152n should be modified. The video frames may be tagged with the metadata tags 254a-254n in response to the objects/events detected by the CNN module 190b. The scheduler circuit 190a may load a directed acyclic graph (DAG) comprising parameters for detecting various types of objects/events and/or identities/classifications of objects. For example, different DAGs may be loaded in response to the types of events of interest and/or particular identities selected by the user. The signal FEAT_SET may comprise parameters for video (e.g., pet detection, types of pets, behavior, number of people in an area, locations of particular items, identifying particular individuals, etc.). The signal FEAT_SET may further comprise parameters for audio (e.g., a maximum audio level, particular frequencies to detect, particular vocal signatures to detect, times of day that particular audio levels are to be detected, etc.). Generally, the processor 102 may compare the characteristics detected in the video frames 230a-230n with the events and/or objects of interest and/or the identities/classifications defined by the user by using the parameters defined by the feature set information. The information provided in the feature set information may be varied according to the design criteria of a particular implementation.

Figure 5:
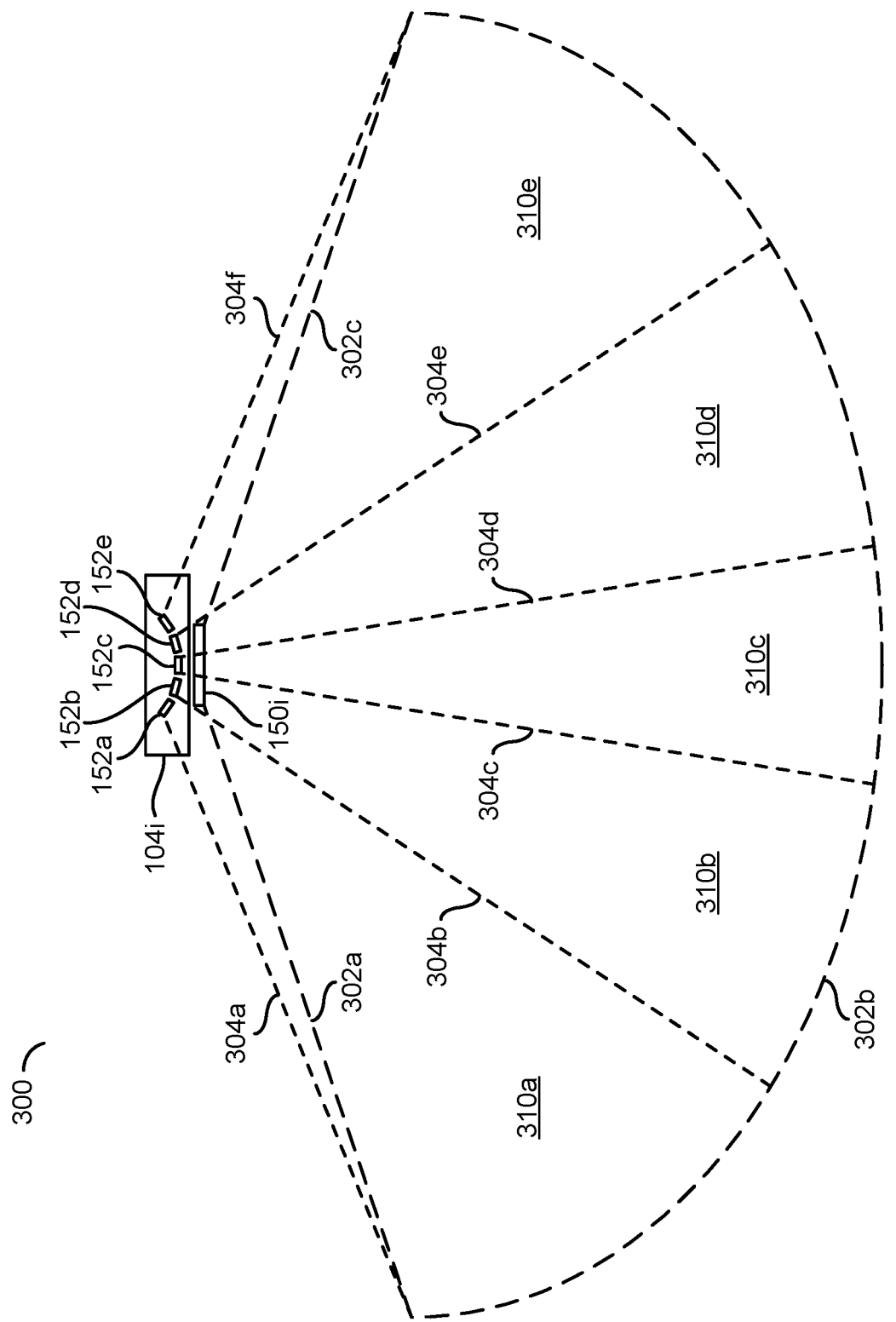
FIG. 5 is a diagram illustrating coverage zones for multiple sensors and a field of view of an image sensor.

Referring to FIG. 5, a diagram illustrating coverage zones for multiple sensors and a field of view of an image sensor is shown. An example, overhead view 300 of the capture device 104*i* is shown. The capture device 104*i* may be a representative example of any of the capture devices 104*a*-104*n* implemented by one or more of the camera systems 100*a*-100*n*. The lens 150*i* of the capture device 104*i* is shown. A number of the activation sensors 152*a*-152*e* are shown. In the example overhead view 300, five of the activation sensors 152*a*-152*e* are shown implemented with the capture device 104*i*. In the example shown, the activation sensors 152*a*-152*e* may be mounted on top of the capture device 104*i*. In some embodiments, fewer or more than five of the activation sensors 152*a*-152*e* may be used with the capture devices 104*a*-104*n*. In some embodiments, the activation sensors 152*a*-152*n* may be mounted underneath the capture devices 104*a*-104*n*. In some embodiments, the activation sensors 152*a*-152*n* may be remotely located from the capture devices 104*a*-104*n* (e.g., mounted at a different location and/or capture a different angle). The PIR controller 232 may be configured to store mounting location and/or capture angles for each of the activation sensors 152*a*-152*n* in order to correlate the capture zones of the activation sensors 152*a*-152*n* with the field of view of the capture devices 104*a*-104*n*. The number and/or arrangement of the activation sensors 152*a*-152*n* with respect to the capture devices 104*a*-104*n* may be varied according to the design criteria of a particular implementation.

A dashed shape 302*a*-302*c* is shown. The dashed shape 302*a*-302*c* may comprise a dashed line 302*a* extending from the lens 150*i*, a dashed line 302*c* extending from the lens 150*i* and a dashed arc 302*b* connecting the dashed line 302*a* and the dashed line 302*c*. The dashed shape 302*a*-302*c* may provide an illustrative example of a field of view of the capture device 104*i*. In the example overhead view 300, the field of view 302*a*-302*c* is shown projected onto a two dimensional plane. The field of view 302*a*-302*c* of the capture devices 104*a*-104*n* may capture a three-dimensional region in space extending from the lens 150*i*. In the example overhead view 300, the field of view 302*a*-302*c* may comprise a range of less than 180 degrees. In some embodiments, the lens 150*i* may capture the field of view 302*a*-302*c* comprising a range of approximately 180 degrees. In some embodiments, the lenses 150*a*-150*n* may enable the capture devices 104*a*-104*n* to capture the field of view 302*a*-302*c* comprising a 360 degree field of view. The shape, distance from the lens 150*i*, range and/or coverage of the field of view 302*a*-302*c* of the capture devices 104*a*-104*n* may be varied according to the design criteria of a particular implementation.

Dashed lines 304*a*-304*f* are shown extending from the activation sensors 152*a*-152*n*. In the example shown, the activation sensors 152*a*-152*n* are shown arranged in a curved pattern to enable each of the activation sensors 152*a*-152*n* to be aimed at different angles in front of the capture device 104*i*. The dashed lines 304*a*-304*f* may generally correspond to a field of view of the activation sensors 152*a*-152*n*.

Areas 310*a*-310*e* are shown. The areas 310*a*-310*e* may comprise coverage zones of the activation sensors 152*a*-152*n*. The coverage zone 310*a* may be a coverage zone of the activation sensor 152*a* (e.g., bound by the dashed lines 304*a*-304*b* and the field of view line 302*b*). The coverage zone 310*b* may be a coverage zone of the activation sensor 152*b* (e.g., bound by the dashed lines 304*b*-304*c* and the field of view line 302*b*). The coverage zone 310*c* may be a coverage zone of the activation sensor 152*c* (e.g., bound by the dashed lines 304*c*-304*d* and the field of view line 302*b*). The coverage zone 310*d* may be a coverage zone of the activation sensor 152*d* (e.g., bound by the dashed lines 304*d*-304*e* and the field of view line 302*b*). The coverage zone 310*e* may be a coverage zone of the activation sensor 152*e* (e.g., bound by the dashed lines 304*e*-304*f* and the field of view line 302*b*).

Similar to the field of view 302*a*-302*c* of the capture device 104*i*, each of the capture zones 310*a*-310*e* of the activation sensors 152*a*-152*n* are shown projected onto a two-dimensional plane in the example overhead view 300. Each of the capture zones 310*a*-310*e* may comprise a three-dimensional region projecting from a respective one of the activation sensors 152*a*-152*e*. Generally, each of the coverage zones 310*a*-310*e* may cover less space than the field of view 302*a*-302*c* of the capture device 104*i*. For example, each of the coverage zones 310*a*-310*n* may cover a subsection of said field of view 302*a*-302*c*. To provide a similar amount of coverage for the space in front of the lens 150*i*, multiple of the activation sensors 152*a*-152*e* may be implemented to enable the coverage zones 310*a*-310*e* to provide similar coverage as the field of view 302*a*-302*c*. In the example shown, the coverage zones 310*a*-310*e* may capture an amount of space outside of the field of view 302*a*-302*c*. In the example shown, the coverage zones 310*a*-310*e* may capture a similar distance from the lens 150*i* as the field of view 302*a*-302*c* (e.g., extending to the dashed arc 302*b*). The amount of coverage of the coverage zones 310*a*-310*c* may be varied according to the design criteria of a particular implementation and may be dynamically adjusted by the processor 102.

The activation sensors 152*a*-152*n* may be configured to trigger the processor 102 in response to motion detected in the coverage zones 310*a*-310*e*. Each of the activation sensors 152*a*-152*n* may independently monitor a respective one of the coverage zones 310*a*-310*n* and generate the activation signals SEN_A-SEN_E in response to motion detected. In an example, if the activation sensor 152*a* detects motion in the coverage zone 310*a*, the activation sensor 152*a* may provide the activation signal SEN_A to the processor 102, while the other activation sensors 152*b*-152*e* do not provide any input. In another example, if the activation sensor 152*c* detects motion in the coverage zone 310*c*, the activation sensor 152*c* may provide the activation signal SEN_C to the processor 102. In yet another example, if the activation sensor 102*d* detects motion in the coverage zone 310*d* and the activation sensor 102*e* detects motion in the coverage zone 310*e* (e.g., a person walks across multiple coverage zones), then the activation sensors 152*d*-152*e* may provide the activation signals SEN_D-SEN_E to the processor 102.

The processor 102 may change modes of operation in response to the activation signals SEN_A-SEN_E. In an example, the processor 102 may be in the sleep mode of operation (e.g., booted up, but not recording the video frames 230*a*-230*n*). In response to motion in the coverage zone 310*b*, the activation signal SEN_B may be provided to the input 174*a* of the processor 102. The processor 102 may change from the sleep mode of operation to the image capture (e.g., high powered) mode of operation in response to the activation signal SEN_B. In response to entering the image capture mode of operation, the processor 102 may generate the control signals CTL_A-CTL_N to activate the capture devices 104*a*-104*n*. For example, the processor 102 may transmit the signal CTL_I from the output 168*i* to enable the capture device 104*i* to generate pixel data for the field of view 302*a*-302*c*. The processor 102 may generate the video frames 230*a*-230*n* of the field of view 302*a*-302*c*. In some embodiments, the coverage zones 310*a*-310*n* may detect motion outside of the field of view 302*a*-302*c*. In the example shown, the coverage zone 310*a* may extend beyond the dashed line 302a. Detecting motion outside of the field of view 302a-302c may enable the capture device 104i to be activated in time for the object to enter the field of view 302a-302c. For example, the object may be outside of the field of view 302a-302c but moving towards the field of view 302a-302c. The coverage zone 310a may detect the motion of the object and activate the processor 102 to enter the image capture mode of operation. The processor 102 may begin capturing the video frames 230a-230n and may capture video frames slightly before the object enters the field of view 302a-302c to provide context and/or avoid being activated too late to capture the object.

The CNN module 190b may perform the computer vision operations on the video frames 230a-230n to detect objects. The CNN module 190b may provide location information indicating where in the field of view 302a-302c the object(s) have been detected. The PIR controller 232 may be configured to determine the range of pixel locations in the video frames 230a-230n that correspond to the coverage zones 310a-310e of the activation sensors 152a-152e. For example, the PIR controller 232 may be configured to associate pixel locations in the video frames 230a-230n with the locations in 3D space that are in the coverage zones 310a-310e. Based on the correlation between the coverage zones 310a-310e and the location that the objects have been detected by the CNN module 190b, the PIR controller 232 may be configured to determine which of the activation sensors 152a-152e detected the motion, how faraway the object was when the motion was detected, the amount of movement of the object was detected, the amount of space of the coverage zones 310a-310e that the motion was detected in, etc.

Based on the type of object detected (e.g., an object of interest, an unknown object or a false positive object), the PIR controller 232 may determine whether to adjust the coverage zones 310a-310e of the activation sensors 152a-152n and/or the configuration parameters for the activation sensors 152a-152n. In one example, one of the coverage zones 310a-310e may be temporarily disabled in response to a false positive detection determined by the CNN module 190b. In another example, the distance range of the coverage zones 310a-310e may be adjusted. In yet another example, particular regions of the coverage zones 310a-310e may be adjusted (e.g., the coverage zone 310a may be adjusted to not extend all the way to the dashed line 304a in response to an undesired object being detected at the edge of the coverage zone 310a). The PIR controller 232 may generate one or more of the parameter control signals PCT_A-PCT_E to adjust the configuration parameters to adjust the coverage zones 310a-310e.

In the example shown, the capture device 104i is shown implemented with the activation sensors 152a-152e configured to provide the coverage zones 310a-310e that may each be smaller than the field of view 302a-302c. In some embodiments, one of the activation sensors (e.g., 152a) may provide a large coverage zone that has a size similar to the field of view 302a-302c of the capture device 104i. In one example, the PIR controller 232 may be configured to suppress alerts of the large coverage zone using the parameter control signal PCT_A. In another example, the PIR controller 232 may be configured to partition the large coverage zone of a single activation sensor into multiple coverage zones, similar to the coverage zones 310a-310e. For example, even though the partitioned coverage zones 310a-310e may be sub-regions of a single large coverage zone of the activation senor 152a, the PIR controller 232 may individually suppress alerts from one more of the sub-region coverage zones 310a-310e using the parameter control signals PCT_A-PCT_E, similar to suppressing the alerts from the coverage zones 310a-310e of the multiple activation sensors 152a-152e.

Figure 6:
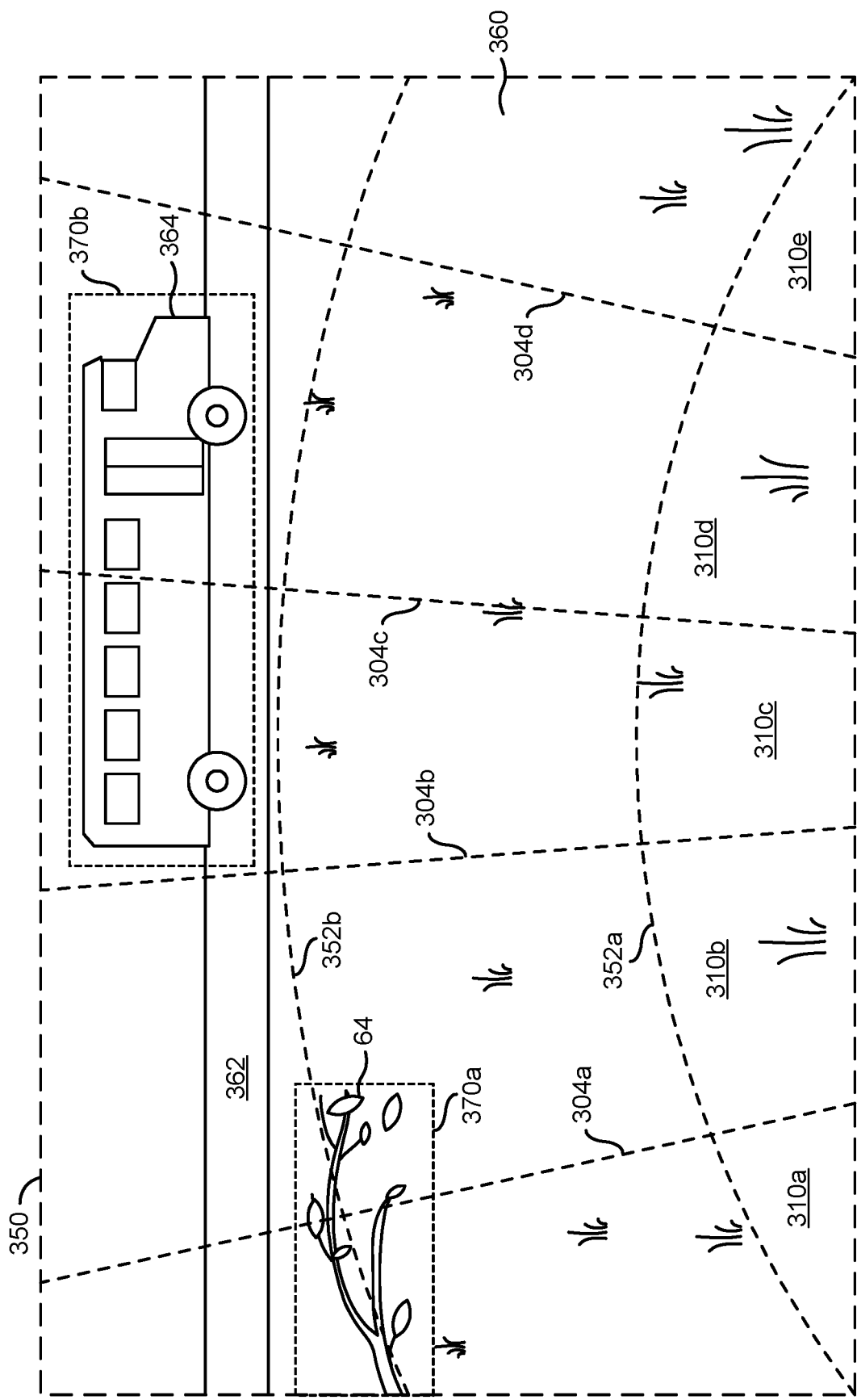
FIG. 6 is a diagram illustrating coverage zones for activation sensors in an example video frame.

Referring to FIG. 6, a diagram illustrating coverage zones for activation sensors in an example video frame is shown. An example video frame 350 is shown. The example video frame 350 may be an illustrative example of the video data and/or pixel data in the video frames 230a-230n. The example video frame 350 may comprise pixel data provided to the CNN module 190b. The CNN module 190b may be configured to analyze the pixel data of the video frames 230a-230n to determine whether the event/object of interest and/or a false positive is present. The types of objects/events detected by the CNN module 190b may be selected by the user and/or defined by the feature set 220 loaded by the processor 102.

The example video frame 350 may be a video captured of a front of the home 50 (e.g., a view from the perspective of the home 50 directed towards a lawn and the road in front of the home 50). The edges of the example video frame 350 may correspond to the field of view 302a-302c shown in association with FIG. 5. The dashed lines 304a-304d indicating the coverage zones 310a-310n of the activation sensors 152a-152e are shown. The coverage zones 310a-310e may illustrate the regions of the example video frame 350 that the PIR controller 232 has associated with each of the activation sensors 152a-152n.

Dashed arced lines 352a-352b are shown. The dashed arcs 352a-352b may represent a coverage range of each of the activation sensors 152a-152n. The coverage range 352a may indicate a minimum detection distance and the coverage range 352b may indicate a maximum detection distance for the activation sensors 152a-152n. For example, motion detected by the activation sensors 152a-152n closer than the minimum coverage range 352a and/or motion detected by the activation sensors 152a-152n farther than the maximum coverage range 352b may be ignored (e.g., the signals SEN_A-SEN_N may not be generated). The distances for the minimum coverage distance 352a and the maximum coverage distance 352b may be set according to the configuration parameters generated by the PIR controller 232 (e.g., in the parameter control signals PCT_A-PCT_N). In some embodiments, the minimum coverage range 352a may be set to a zero value. In the example shown, the coverage distances 352a-352b are each shown generally equal for each of the coverage zones 310a-310e. However, as the PIR controller 232 adjusts the configuration parameters using the parameter control signals PCT_A-PCT_N, each of the coverage zones 310a-310n may implement differing coverage distances 352a-352b independent from the other coverage zones 310a-310n.

The example video frame 350 may comprise the tree branch 64, a lawn 360 in front of the home 50, a road 362 in front of the home 50 and a bus 364. The tree branch 64 may be located on the lawn 360 (e.g., the tree 62 located on the lawn 360 may be out of range of the field of view 302a-302c of the example video frame 350). The bus 364 may be driving on the road 362. For example, the road 362 may be a bus route and the bus 364 may drive past the home 50 multiple times per day according to a schedule.

Dotted shapes 370a-370b are shown. The dotted shapes 370a-370b may represent the detection of an object by the computer vision operations performed by the processor 102. The dotted shapes 370a-370b may comprise the pixel data corresponding to an object detected by the computer vision operations pipeline and/or the CNN module 190b. The dotted shapes 370a-370b are shown for illustrative purposes. In an example, the dotted shapes 370a-370b may be visual representations of the object detection (e.g., the dotted shapes 370a-370b may not appear on an output video frames 240a-240n sent to the remote devices 204a-204n). In another example, the dotted shapes 370a-370b may be a bounding box generated by the processor 102 displayed on the output video frames to indicate that an object has been detected (e.g., the bounding boxes 370a-370b may be displayed in a debug mode of operation). In yet another example, the bounding boxes 370a-370b may represent location coordinates of each of the object within the field of view 302a-302c of the capture device 104i that may be used by the PIR controller 232 to correlate with the coverage zones 310a-310n of the activation sensors 152a-152n.

The computer vision operations may be configured to detect characteristics of the detected objects and/or behavior of the objects detected. The characteristics of the objects may comprise a height, length, width, slope, an arc length, a color, an amount of light emitted, detected text on the object, a path of movement, a speed of movement, a direction of movement, etc. The characteristics of the detected object may comprise a status of the object (e.g., opened, closed, on, off, etc.). The behavior may be determined in response to the type of object and/or the characteristics of the objects detected. While one example video frame 350 is shown, the behavior of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 370a may be the detection of the tree branch 64 and the bounding box 370b may be the detection of the bus 364. In an example, the settings (e.g., the feature set) for the processor 102 may define objects of interest to be people and vehicles. For example, the tree branch 64 may not be one of the objects of interest (e.g., detecting generally static objects may result in continually detecting events). In another example, detecting a vehicle may be the detection of an object of interest. However, the processor 102 may take into account various contextual information. For example, the bus 364 may regularly pass through the field of view captured in the video frame 350 and the end user may not want the camera systems 100a-100n activated by the bus 364 driving according to the schedule. In an example, a vehicle that drives towards the home 50 (e.g., up a driveway, not shown) may be an object of interest, but a vehicle driving on the road 362 may not be an object of interest. In another example, a person (e.g., an unrecognized person) may be an object of interest but the homeowner may not be an object of interest (e.g., the end user may not want video recorded of a family member cutting the lawn 360). The CNN module 190b may implement facial recognition and/or person identification to distinguish between a detected event and a false positive. For example, the face of the homeowner may be a known person and not considered an event, but the face of the delivery person may be unknown and the unknown face may be considered an event.

Various types of objects detected may be considered events or false positives depending on the detected context. In an example, an amount of movement may be a CV event. For example, slight movement of the tree branch 64 may be a false positive, but the user may want to record video when the weather is very windy and a significant movement of the tree branch 64 may be defined as an event instead of a false positive. In another example, the bus 364 on the road 362 may not be considered an event (e.g., to avoid notifications each time the same bus 364 drives by on a bus schedule), but when a delivery truck is parked on the road 364, the processor 102 may determine an event has been detected. The feature set 220 may be used to define the AI model 250 to determine which types of objects and/or characteristics are determined to be events in various contexts. The types of objects, movements, events that may be considered events and/or false positives may be varied according to the design criteria of a particular implementation.

The example video frame 350 may be tagged in response to the CNN module 190b detecting objects and/or events. For example, the detection of the tree branch 64 and/or the detection of the bus 364 may each generate metadata information for the metadata tags 254a-254n (e.g., corresponding to one or more of the bounding boxes 370a-370b). Other data, such as a timestamp and/or locations of the bounding boxes 370a-370c may be part of the metadata tagged for the video frame 350. The metadata may comprise multiple tags (e.g., one metadata tag for detecting the tree branch 64, another metadata tag for detecting the bus 354, another metadata tag for another object detected, etc.). The number of metadata tags and/or the type of data stored with the metadata may be varied according to the design criteria of a particular implementation.

In the example shown, the movement of the tree branch 64 in the coverage zones 310a-310b may cause the activation sensors 152a-152b to generate the signals SEN_A-SEN_B. The movement of the bus 364 in the coverage zones 310c-310d may not cause the activation sensors 152c-152d to generate the signals SEN_C-SEN_D because the bus 364 is beyond the maximum distance 352b in the coverage zones 310c-310d. The reception of any of the activation signals SEN_A-SEN_B may cause the processor 102 to switch from the sleep mode of operation to the high power (or video/image capture) mode of operation and generate the control signals CTL_A-CTL_N to activate the capture devices 104a-104n to generate the video frames 230a-230n. While two of the activation signals SEN_A-SEN_B would be generated in the example shown, the generation of any one of the activation signals SEN_A-SEN_E may be sufficient to activate the processor 102 to change modes of operation.

After the processor 102 changes from the sleep mode of operation to the video/image capture mode of operation and the capture devices 104a-104n are activated via the control signals CTL_A-CTL_N, the processor 102 may generate the video frames 230a-230n in response to the pixel data generated by the capture devices 104a-104n. The CNN module 190b may perform the computer vision operations on the video frames 230a-230n, which may include the example video frame 350. In the example video frame 350, the CNN module 190b may detect the tree branch 64 and provide the object classification and/or location in the bounding box 370a and detect the bus 364 and provide the object classification and/or location in the bounding box 370b. The CNN module 190b may classify the tree branch 64 as a false positive detection (e.g., an uninteresting object) based on the characteristics of the object detected (e.g., generally static with slight movement, not moving outside of expected movement range (e.g., no excessive movement indicating high wind), the type of object is a tree, etc.). The CNN module 190b may classify the bus 364 as a false positive detection, despite a vehicle being an object that may be potentially an object of interest (e.g., mitigating factors such as the bus 364 being on the road 362 instead of on a driveway to the home 50 and the bus 364 having been previously detected indicating a bus route may result in a false positive classification). The CNN module 190b may provide the information from the bounding boxes 370a-370b in the metadata tags 254a-254n to the video encoding module 236 to generate the output video frames 240a-240n. The CNN module 190b may provide the information from the bounding boxes 370a-370b in the metadata tags 254a-254n to the PIR controller 232. While the processor 102 is in the video/image capture mode of operation, the output video frames 240a-240n may be generated.

The PIR controller 232 may determine which of the detected objects 370a-370b were detected in which of the coverage regions 310a-310e. The PIR controller 232 may read the location information and/or the classification information about the detected object 370a. The PIR controller 232 may determine that a false positive object was detected in the coverage regions 310a-310b and within the detection ranges 352a-352b. In response to the type of object detected (e.g., the tree branch 64 may not move to a different location or move out of the video frame 350), the PIR controller 232 may determine an adjustment for the parameters of the activation sensors 152a-152b. In the example shown, the adjustment determined to be appropriate for the preventing more false positive detections from the activation sensors 152a-152b may be to temporarily disable the activation sensors 152a-152b. The PIR controller 232 may determine that a temporary disabling of the activation sensors 152a-152b may be an appropriate response (e.g., adjusting the range and/or sensitivity may not help, but waiting for a later time that may be less windy may prevent false positives). The PIR controller 232 may generate the parameter control signals PCT_A-PCT_B to provide updated configuration parameters for the activation sensors 152a-152b. In response to receiving the parameter control signals PCT_A-PCT_B, the activation sensors 152a-152b may be temporarily disabled.

In another example, the PIR controller 232 may read the location information and/or the classification information about the detected object 370b. The PIR controller 232 may determine that an object that would be detected as a false positive object was detected in the video frame 350 corresponding to the coverage regions 310c-310d. However, the false positive object (e.g., the bus 364) may not be within the detection ranges 352a-352b. Since the activation sensors 152c-152d may already be appropriately set to avoid the false positive detection of the bus 364, the PIR controller 232 may determine that additional adjustments to the configuration parameters for the activation sensors 152c-152d may not be needed.

In another example, over the sequence of video frames analyzed by the processor 102, the PIR controller 232 may determine that the bus 364 may move into the coverage zone 310e based on the direction of motion of the bus 364. The maximum coverage distance 352b for the coverage zone 310e may not extend all the way to the road 362. In response to detecting the bus 364 and predicting the movement path of the bus 364, the PIR controller 232 may determine that the maximum coverage distance 352b for the coverage zone 310e may be extended without resulting in false positives due to the bus 364. In response to determining that the coverage zone 310e may be extended, the PIR controller 232 may generate the parameter control signal PCT_E. In response to the parameter control signal PCT_E, the activation sensor 152e may extend the coverage zone 310e.

Figure 7:
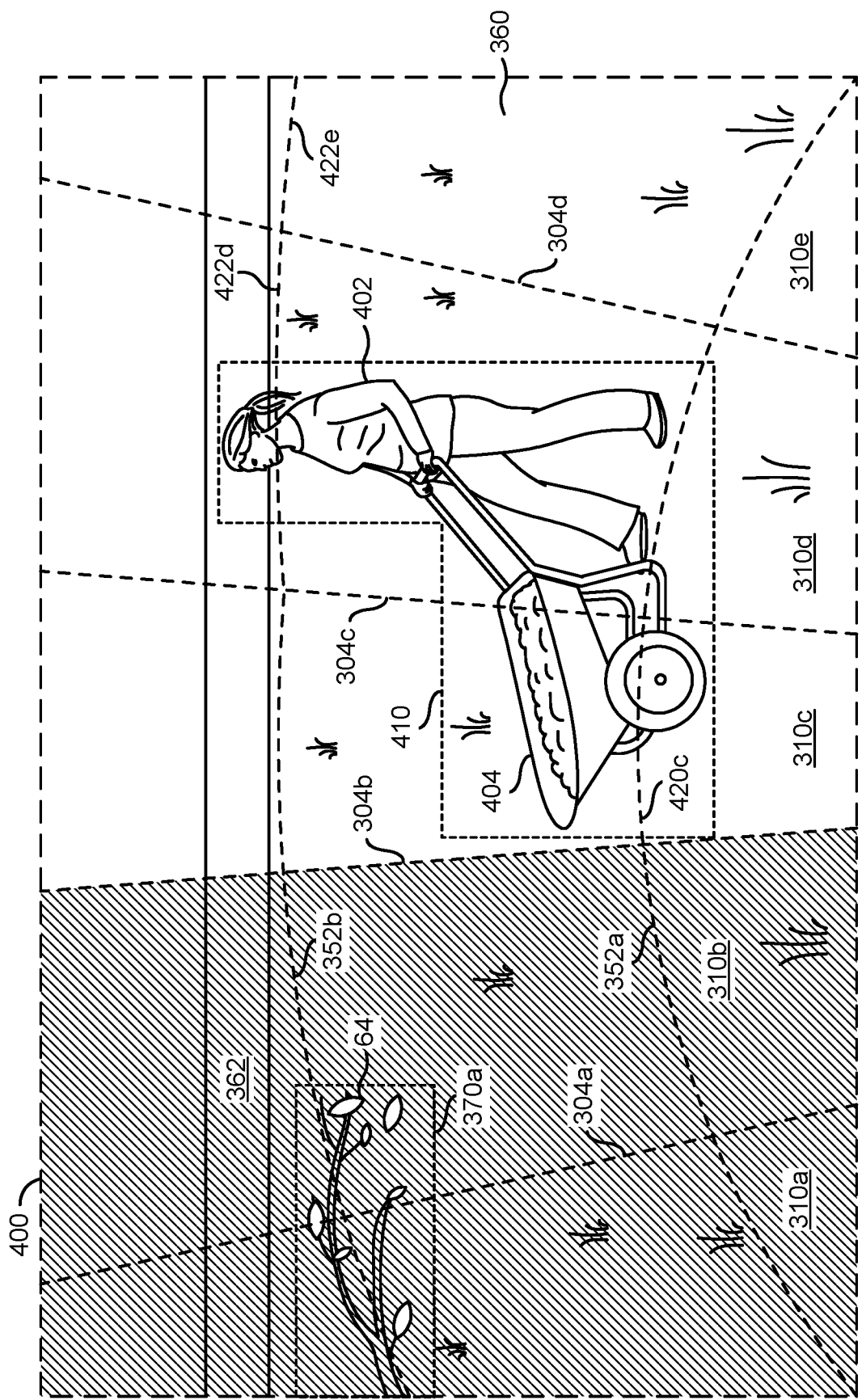
FIG. 7 is a diagram illustrating automatically calibrated coverage zones for activation sensors in an example video frame.

Referring to FIG. 7, a diagram illustrating automatically calibrated coverage zones for activation sensors in an example video frame is shown. The example video frame 400 may be an illustrative example of the video data and/or pixel data in the video frames 230a-230n after an automatic calibration of the activation sensors 152a-152e by the processor 102. The example video frame 400 may comprise pixel data provided to the CNN module 190b. The example video frame 400 may be one of the video frames 230a-230n captured after the example video frame 350 shown in association with FIG. 6 (e.g., after the PIR controller module 232 has generated one or more of the parameter control signals PCT_A-PCT_E).

The example video frame 400 may comprise similar content as the example video frame 350. For example, the example video frame 400 may comprise the tree branch 64, the dashed lines 304a-304d, the coverage zones 310a-310e, the minimum coverage range 352a, the maximum coverage range 352b, the lawn 360 and the road 362. Since the example video frame 400 may be captured after the example video frame 350, the bus 364 may no longer be in the field of view 302a-302c of the capture device 104i.

The example video frame 400 may further comprise a person 402, a wheelbarrow 404, a dotted box 410, a minimum coverage range 420c, and maximum detection ranges 422d-422e. The person 402 may be a home owner performing yard work using the wheelbarrow 404. The dotted box 410 may represent an object detected by the CNN module 190b (e.g., the person 402 and the wheelbarrow 404). The minimum detection range 420c may correspond to the coverage zone 310c. The maximum detection ranges 422d-422e may correspond to the coverage zones 310d-310e.

The coverage zones 310a-310b are shown shaded. The shading of the coverage zones 310a-310b may represent an indication that the corresponding activation sensors 152a-152b have been temporarily disabled. In an example, in response to detecting that the tree branch 64 caused the activation sensors 152a-152b to generate the activation signals SEN_A-SEN_B as a false positive, the CNN module 190b and/or the PIR controller 232 may have determined that the activation sensors 152a-152b provided a false positive. The PIR controller 232 may determine that the activation sensors 152a-152b should be disabled. The PIR controller 232 may have generated the parameter control signals PCT_A-PCT_B that may temporarily disable the activation sensors 152a-152b (e.g., for a predetermined amount of time). For example, since the detected object 370a (e.g., the tree branch 64) may not activate the video/image capture mode of operation for the processor 102, the video frames 230a-230n may not have been generated until another activation by the activation sensors 152c-152e that are currently enabled. For example, the detection of the object 470 by the activation sensors 152c-152d may have resulted in the signals SEN_C-SEN_D activating the video/image processing mode of operation.

In an example, on a windy day, movement of the tree branch 64 may have repeatedly caused the activation sensors 152a-152b to generate the activation signals SEN_A-SEN_B. After being activated by the activation sensors 152a-152b, the processor 102 may have performed the computer vision operations and determined that tree branch 64 was a false positive. After returning to the sleep mode of operation, the activation sensors 152a-152b may detect the movement of the tree branch 64 again, causing the processor 102 to perform computer vision operations in response to the signals SEN_A-SEN_B. The PIR controller 232 may track how many false positives that each of the activation sensors 152a-152n have caused. After a predetermined number of false positives, instead of adjusting a range and/or sensitivity of the activation sensors 152a-152e, the PIR controller 232 may temporarily disable the particular activation sensors 152a-152e that are detecting the false positives. The PIR controller 232 may determine how long to disable each of the activation sensors 152a-152n based on the types of objects detected that are causing the false positive. In one example, since the object 370a is the tree branch 64, which is a generally static object that may sway continually, the PIR controller 232 may select a longer time for disabling the activation sensors 152a-152b (e.g., 30 minutes). In another example, for the bus 364, the PIR controller 232 may determine that the detected object 370b may only be in the video frames 230a-230n briefly (e.g., as the bus 364 passes by) and disabling the activation sensors 152a-152n may not be a suitable reaction. In yet another example, since the bus 364 may pass by on a schedule (e.g., for a city bus route), the PIR controller 232 may learn the timing of the bus 364 and temporarily disable the activation sensors 152a-152n for the particular times that the bus 364 is likely to drive by. In still another example, the PIR controller 232 may determine that a false positive is caused by sunlight glare that occurs at particular times of the year, and the PIR controller 232 may temporarily disable the activation sensors 152a-152n at particular times of the day for weeks and/or months at a time when the sunlight is likely to cause glare. The amount of time for disabling the activation sensors 152a-152n based on various types of objects may be varied according to the design criteria of a particular implementation.

The CNN module 190b and/or the PIR controller 232 may detect the object 410 and/or which of the coverage zones 310a-310e correspond to the location of the detected object 410. The CNN module 190b and/or the PIR controller 232 may determine that the object 410 may be within the coverage zones 310c-310d. The CNN module 190b may determine that the detected object 410 may be a homeowner performing yardwork. The detected object 410 may not be a false positive (e.g., the generation of the activation signals SEN_C-SEN_D to activate the video/image processing mode of operation may be a correct detection of an object/event of interest). Since the activation has been determined to be accurate, adjusting the parameters of the activation sensor 152c-152d in order to reduce detections may not be beneficial.

The PIR controller 232 may further refine the coverage zones 310c-310d in response to the location of the detected object 410. In the example shown, a portion of the wheelbarrow 404 may be closer to the activation sensor 152c than the minimum detection range 420c of the coverage zone 310c. The PIR controller 232 may determine to further refine the coverage zone 310c by reducing the minimum detection range 420c (e.g., enable detections closer to the activation sensor 152c based on the location of the detected object 410). For example, the PIR controller 232 may generate the parameter control signal PCT_C to adjust the minimum detection range 420c for the activation sensor 152c.

The maximum detection ranges 422d-422e for the coverage zones 310d-310e are shown adjusted in the example video frame 400 compared to the example video frame 350. For example, the processor 102 may have determined that the maximum detection ranges 422d-422e may be extended to reach as far as the road 362, without increasing false detections (e.g., the bus 364 may not be detected until the maximum detection ranges 422d-422e of the coverage zones 310a-310e reach past the road 362). For example, prior to the capture of the example video frame 400, the PIR controller 232 may have generated the parameter control signals PCT_D-PCT_E in order to provide the increased maximum detection ranges 422d-422e for the activation sensors 152d-152e.

Figure 8:
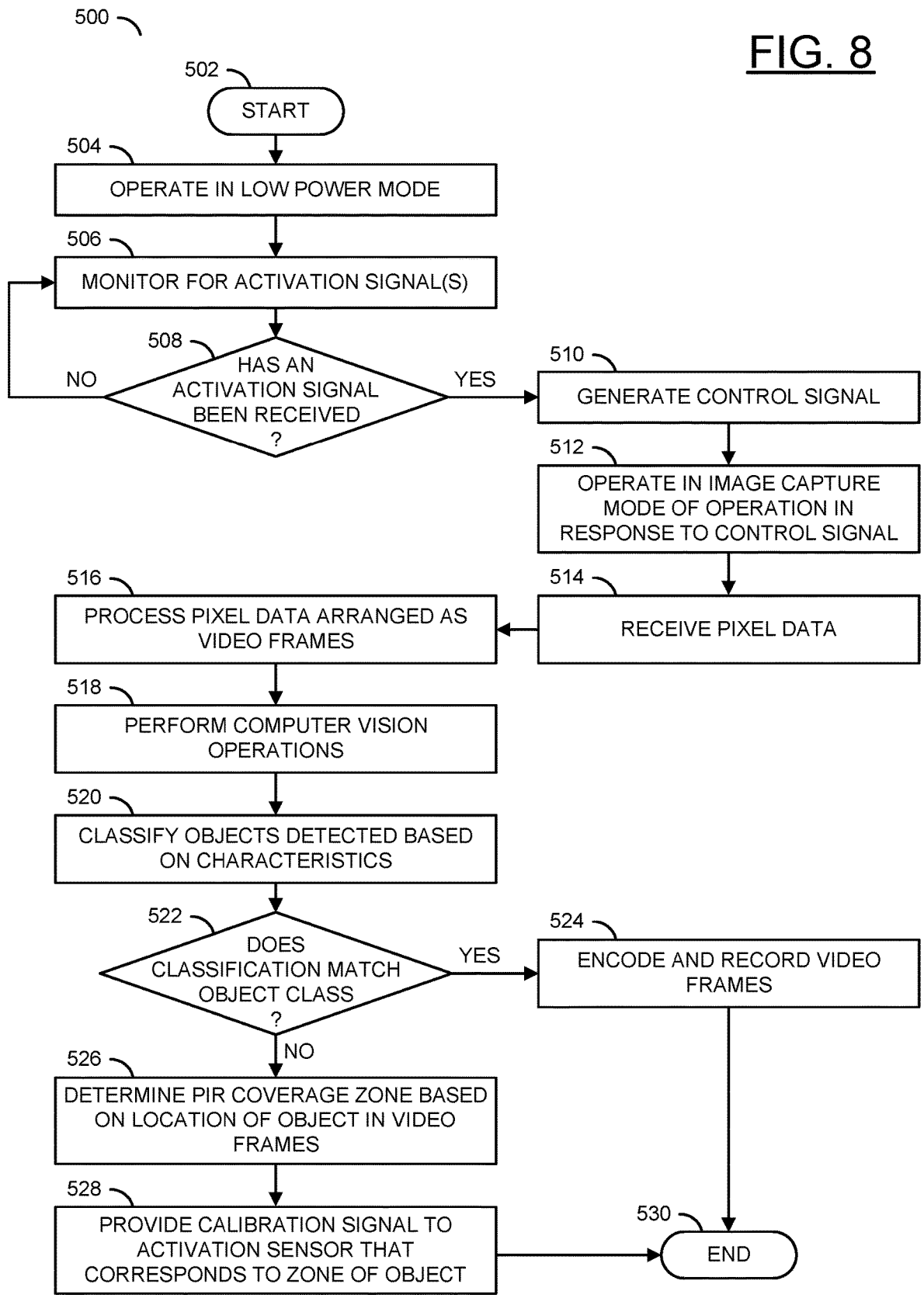
FIG. 8 is a flow diagram illustrating a method for dynamically adjusting activation sensor parameters using computer vision.

Referring to FIG. 8, a method (or process) 500 is shown. The method 500 may dynamically adjust activation sensor parameters using computer vision. The method 500 generally comprises a step (or state) 502, a step (or state) 504, a step (or state) 506, a decision step (or state) 508, a step (or state) 510, a step (or state) 512, a step (or state) 514, a step (or state) 516, a step (or state) 518, a step (or state) 520, a decision step (or state) 522, a step (or state) 524, a step (or state) 526, a step (or state) 528, and a step (or state) 530.

The step 502 may start the method 500. In the step 504, the processor 102 may operate in the low power mode of operation. For example, in the low power mode of operation, the processor 102 may perform limited operations, video encoding may not be performed, computer vision operations may not be performed, the capture devices 104a-104n may not generate pixel data, etc. Next, in the step 506, the processor 102 may monitor the input 174a for the activation signals SEN_A-SEN_N. Next, the method 500 may move to the decision step 508.

In the decision step 508, the processor 102 may determine whether one or more of the activation signals SEN_A-SEN_N have been received. For example, the activation sensors 152a-152n may generate the activation signals SEN_A-SEN_N in response to motion and/or infrared light in the coverage zones 310a-310n. If the none of the activation signals SEN_A-SEN_N have been received, then the method 500 may return to the step 506. If one or more of the activation signals SEN_A-SEN_N have been received, then the method 500 may move to the step 510. In the step 510, the processor 102 may generate one or more of the control signals CTL_A-CTL_N from the outputs 168a-168n. Next, in the step 512, the processor 102 may operate in the image capture mode of operation in response to the control signals CTL_A-CTL_N. For example, the control signals CTL_A-CTL_N may activate the respective capture devices 104a-104n. In the step 514, the processor 102 may receive pixel data. For example, the processor 102 may receive the pixel data signals PIXELD_A-PIXELD_N at the inputs 170a-170n from the capture devices 104a-104n. Next, the method 500 may move to the step 516.

In the step 516, the processor 102 may process the pixel data arranged as the video frames 230a-230n. Next, in the step 518, the CNN module 190b may perform the computer vision operations on the video frames 230a-230n. In the step 520, the CNN module 190b may classify the objects detected by the computer vision operations based on the characteristics of the objects. Next, the method 500 may move to the decision step 522.

In the decision step 522, the CNN module 190b may determine whether the classification of the detected object matches a particular object class. For example, the CNN module 190b may detect and/or classify objects based on the feature set 220 implemented by the AI model 250. In some embodiments, the object classes used for matching the detected objects may be considered objects of interest (e.g., objects that are not considered false positives). If the object classification does match the object class, then the method 500 may move to the step 524. In the step 524, the video encoding pipeline 236 may encode the tagged video frames 234a-234n, and record the encoded video frames 240a-240n generated. Next, the method 500 may move to the step 530.

In the decision step 522, if the object classification does not match the object class, then the method 500 may move to the step 526. In the step 526, the PIR controller 232 may determine the PIR coverage zones 310a-310n based on the location of the object detected in the videoframes 230a-230n. For example, the PIR controller 232 may correlate the location coordinates of the objects detected (e.g., the bounding boxes 370a-370b) with the coverage zones 310a-310n (e.g., based on the currently applied operating parameters) to determine which of the activation sensors 152a-152n detected which objects. Next, in the step 528, the PIR controller 232 may provide the parameter calibration signals PCT_A-PCT_N to the particular activation sensors 152a-152n that correspond to the zone of the objects that resulted in the false positive. Next, the method 500 may move to the step 530. The step 530 may end the method 500.

Figure 9:
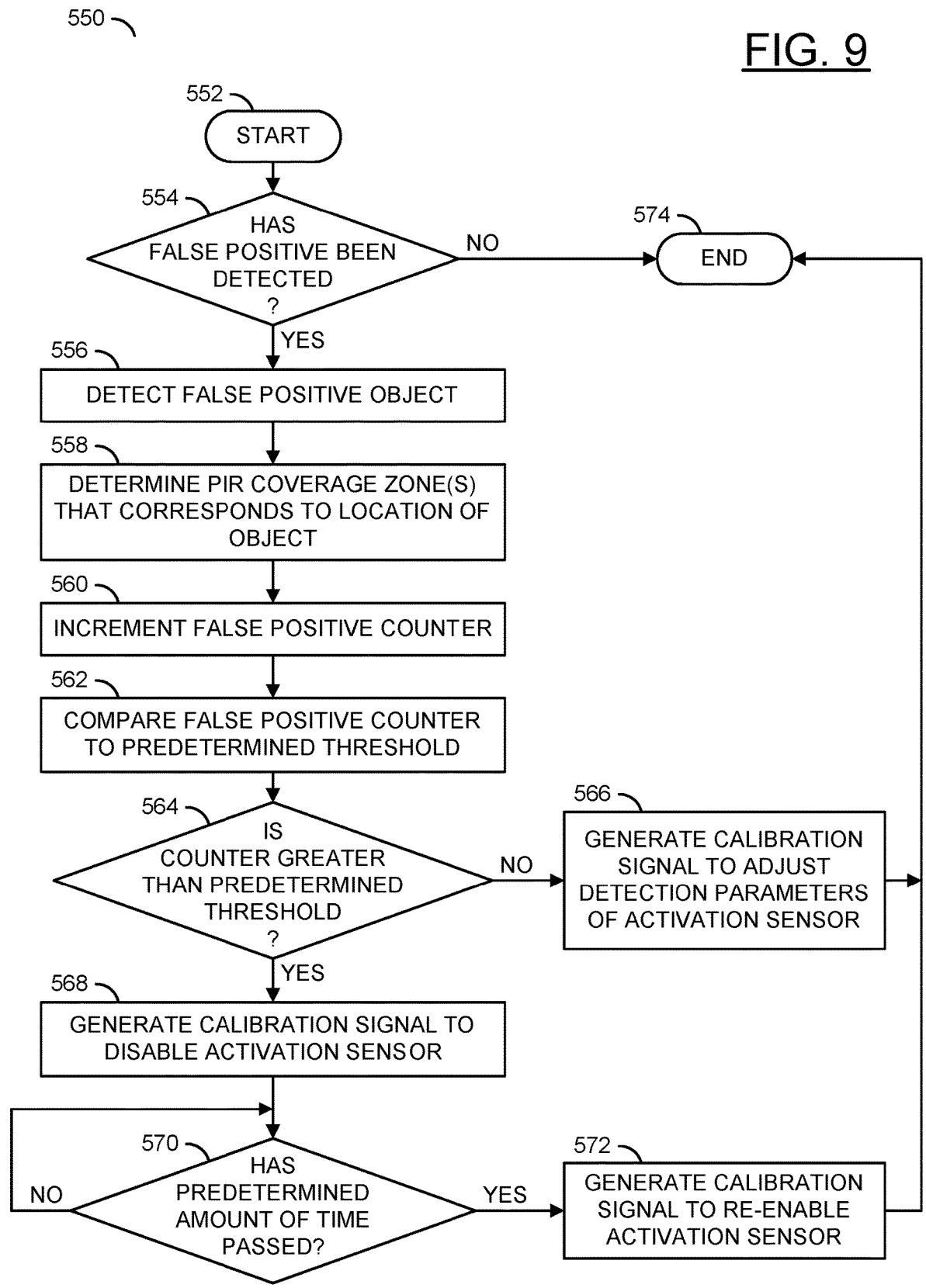
FIG. 9 is a flow diagram illustrating a method for disabling coverage zones after a pre-determined number of false positive detections.

Referring to FIG. 9, a method (or process) 550 is shown. The method 550 may disable coverage zones after a predetermined number of false positive detections. The method 550 generally comprises a step (or state) 552, a decision step (or state) 554, a step (or state) 556, a step (or state) 558, a step (or state) 560, a step (or state) 562, a decision step (or state) 564, a step (or state) 566, a step (or state) 568, a decision step (or state) 570, a step (or state) 572, and a step (or state) 574.

The step 552 may start the method 550. In the decision step 554, the processor 102 may determine whether a false positive has been detected in response to the computer vision operations. If a false positive has not been detected, then the method 550 may move to the step 574. If a false positive has been detected, then the method 550 may move to the step 556.

In the step 556, the CNN module 190b may indicate that the false positive has been detected. For example, the CNN module 190b may add the false positive to the metadata 254a-254n of the tagged video frames 234a-234n. Next, in the step 558, the PIR controller 232 may determine the PIR coverage zones 310a-310n that correspond to the locations of the detected objects 370a-370n that resulted in the false positive. In the step 560, the PIR controller 232 may increment the false positive counter for each of the activation sensors 152a-152n that correspond to the coverage zones 310a-310n that were determined to have detected the false positive. Next, in the step 562, the PIR controller 232 may compare the false positive counter to a predetermined threshold. In an example, the predetermined threshold may be a manually selected limit for how many false positives are acceptable before temporarily disabling one or more of the activation sensors 152a-152n. Next, the method 550 may move to the decision step 564.

In the decision step 564, the PIR controller 232 may determine whether the counter for a particular one of the activation sensors 152a-152n is greater than the predetermined threshold. If the counter is not greater than the predetermined threshold, then the method 550 may move to the step 566. In the step 566, the PIR controller 232 may generate one or more of the parameter calibration signals PCT_A-PCT_N to adjust the detection parameters of the activation sensors 152a-152n (e.g., adjust a sensitivity, adjust the minimum detection range 352a, adjust the maximum detection range 352b, etc.). Next, the method 550 may move to the step 574.

In the decision step 564, if the counter is above the predetermined threshold, then the method 550 may move to the step 568. In the step 568, the PIR controller 232 may generate one or more of the parameter calibration signals PCT_A-PCT_N to temporarily disable one or more of the activation sensors 152a-152n. Next, the method 550 may move to the decision step 570.

In the decision step 570, the PIR controller 232 may determine whether a predetermined amount of time has passed. The predetermined amount of time may be the amount of time that one or more of the activation sensors 152a-152n may be temporarily disabled. The amount of time may be a preset time and/or may be selected based on the type of object detected. If the predetermined amount of time has not passed, then the method 550 may return to the decision step 570. If the predetermined amount of time has passed, then the method 550 may move to the step 572. In the step 572, the PIR controller 232 may generate one or more of the parameter calibration signals PCT_A-PCT_N to re-enable the activation sensors 152a-152n that have been temporarily disabled. Next, the method 550 may move to the step 574. The step 574 may end the method 550.

Figure 10:
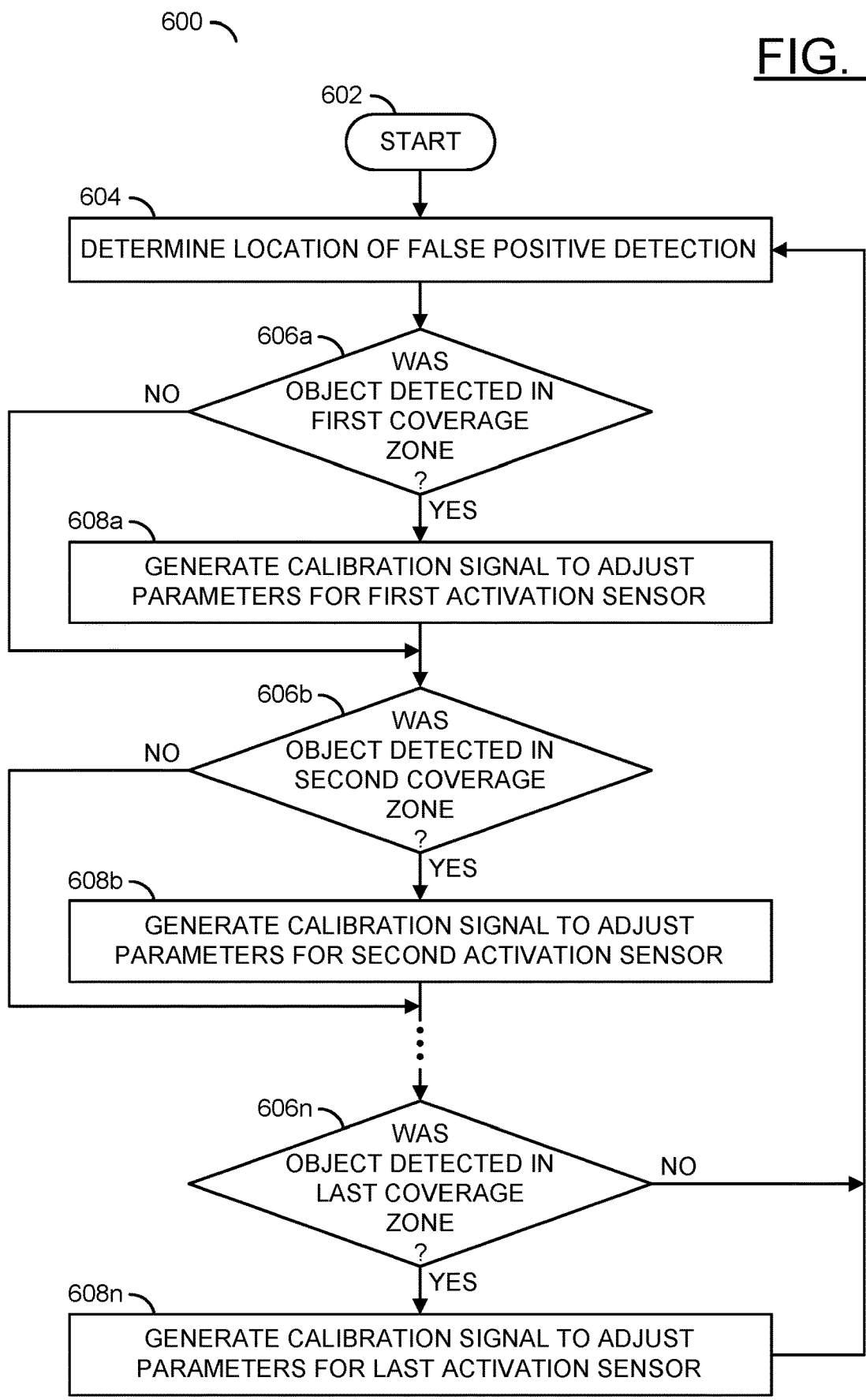
FIG. 10 is a flow diagram illustrating a method for independently managing coverage zones of multiple activation sensors.

Referring to FIG. 10, a method (or process) 600 is shown. The method 600 may independently manage coverage zones of multiple activation sensors. The method 600 generally comprises a step (or state) 602, a step (or state) 604, a number of decision steps (or states) 606a-606n, and a number of steps (or states) 608a-608n.

The step 602 may start the method 600. In the step 604, the processor 102 may determine the location of the false positive detection in the video frames 230a-230n (e.g., coordinates and/or depth of the bounding boxes 370a-370n). Next, the method 600 may move to the decision steps 606a-606n. While the decisions steps 606a-606n and the steps 608a-608n are shown sequentially, the processor 102 and/or the PIR controller 232 may be configured to perform the decisions steps 606a-606n and/or the steps 608a-608n in parallel and/or substantially in parallel. For example, the decision steps 606a-606n and/or the steps 608a-608n may comprise the independent and dynamic management of the configuration parameters of the activation sensors 152a-152n by the processor 102 in response to the computer vision operations.

In the decision step 606a, the processor 102 may determine whether the false positive object was detected in the first coverage zone 310a. If the false positive object was not detected in the first coverage zone 310a, then the method 600 may move to the decision step 606b. If the false positive object was detected in the first coverage zone 310a, then the method 600 may move to the step 608a. In the step 608a, the PIR controller 232 may generate the parameter calibration signal PCT_A in order to adjust the detection parameters for the first activation sensor 152a. Next, the method 600 may move to the decision step 606b.

In the decision step 606b, the processor 102 may determine whether the false positive object was detected in the second coverage zone 310b. If the false positive object was not detected in the second coverage zone 310b, then the method 600 may move to the decision step 606c. If the false positive object was detected in the second coverage zone 310b, then the method 600 may move to the step 608b. In the step 608b, the PIR controller 232 may generate the parameter calibration signal PCT_B in order to adjust the detection parameters for the second activation sensor 152b. Next, the method 600 may move to the decision step 606c. The method 600 may continue through the decision steps 606c-606n and/or the steps 608c-608n.

In the decision step 606n, the processor 102 may determine whether the false positive object was detected in the last coverage zone 310n. If the false positive object was not detected in the last coverage zone 310n, then the method 600 may return to the step 604. If the false positive object was detected in the last coverage zone 310n, then the method 600 may move to the step 608n. In the step 608n, the PIR controller 232 may generate the parameter calibration signal PCT_N in order to adjust the detection parameters for the last activation sensor 152n. Next, the method 600 may return to the step 604.

Figure 11:
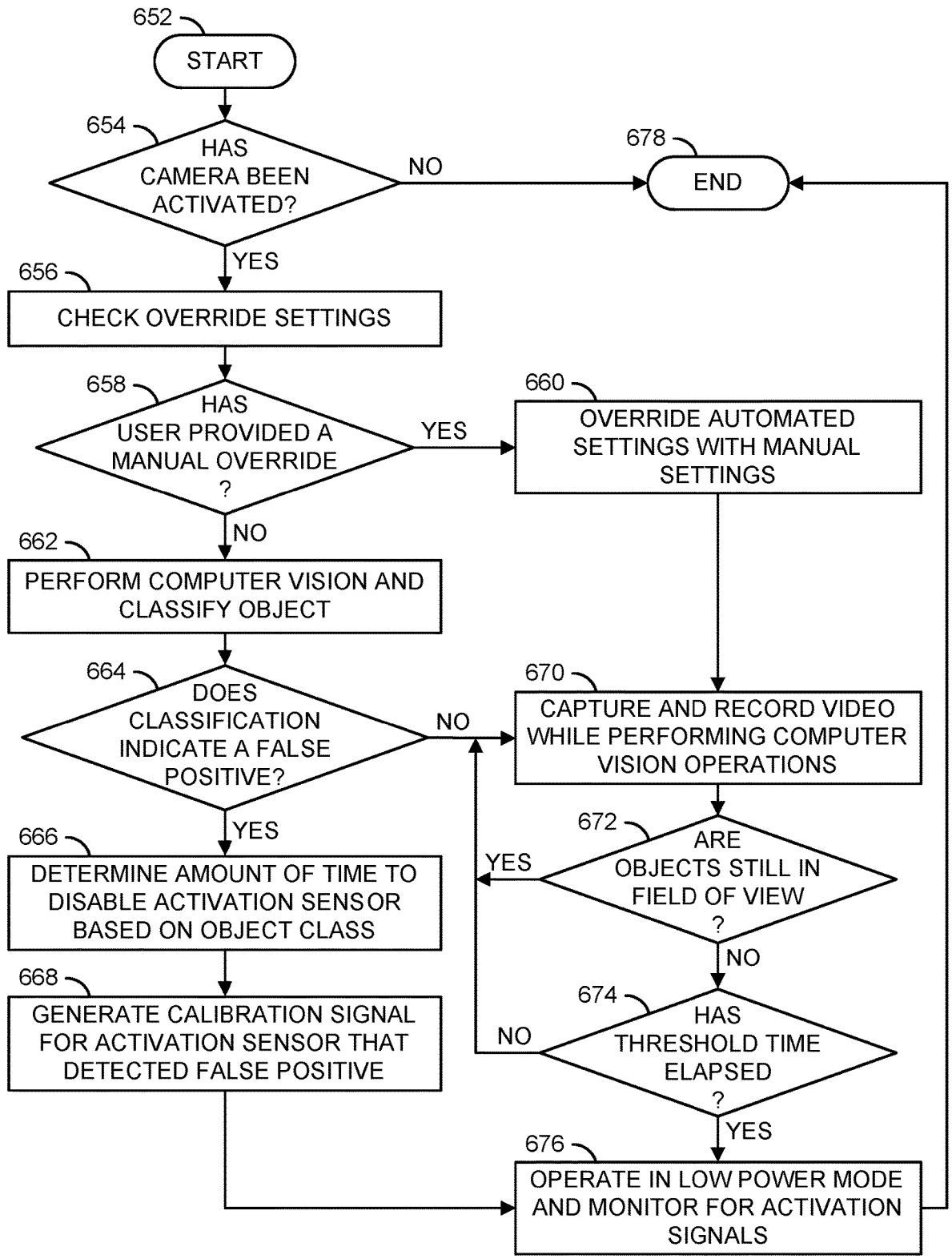
FIG. 11 is a flow diagram illustrating a method for overriding automatic calibration in response to a manual input.

Referring to FIG. 11, a method (or process) 650 is shown. The method 650 may override automatic calibration in response to a manual input. The method 650 generally comprises a step (or state) 652, a decision step (or state) 654, a step (or state) 656, a decision step (or state) 658, a step (or state) 660, a step (or state) 662, a decision step (or state) 664, a step (or state) 666, a step (or state) 668, a step (or state) 670, a decision step (or state) 672, a decision step (or state) 674, a step (or state) 676, and a step (or state) 678.

The step 652 may start the method 650. In the decision step 654, the processor 102 may determine whether the capture devices 104a-104n have been activated. For example, the capture devices 104a-104n may be activated in response to the control signals CTL_A-CTL_N from the processor 102 after the activation sensors 152a-152n have provided the activation signals SEN_A-SEN_N to the processor 102. If the capture devices 104a-104n have not been activated (e.g., the processor 102 is operating in the low power mode of operation), then the method 650 may move to the step 678. If the capture devices 104a-104n have been activated, then the method 650 may move to the step 656. In the step 656, the processor 102 may check for any override settings. Next, the method 650 may move to the decision step 658.

The override settings may comprise manual settings provided by a user. In an example, the override settings may be stored in the memory 160. The override settings may comprise specific settings selected by an end user. For example, the end user may select more sensitive settings when on vacation (e.g., to ensure no potentially important recordings are missed such as burglars near the home). In another example, the end user may select less sensitive settings when working from home (e.g., to ensure fewer notifications and/or recordings because the end user is at home and does not want to be disturbed). The manual override settings may take priority over the automatic dynamic settings selected by the processor 102. The type of parameters manual input by the end user may be varied according to the design criteria of a particular implementation.

In the decision step 658, the processor 102 may check the memory 160 to determine whether any manual override settings have been stored for the current scenario. For example, manual override settings may be selected for a particular time of day, time of year, weather conditions, etc. If manual override settings have been provided, then the method 650 may move to the step 660. In the step 660, the processor 102 may override any automated settings from the PIR controller 232 with the manual settings. For example, the PIR controller 232 may generate the parameter configuration signals PCT_A-PCT_N with the manual override settings. Next, the method 650 may move to the step 670. For example, the processor 102 may skip performing the computer vision operations for detecting false positive detections when the manual override settings are active. In some embodiments, the processor 102 may still perform the computer vision operations for detecting false positives even while the manual override settings are active in order to collect video frames and/or metadata to use for training data.

In the decision step 658, if the user has not provided manual override settings and/or the manual override settings are not applicable to the current conditions, then the method 650 may move to the step 662. In the step 662, the processor 102 may perform the computer vision operations in order to classify the detected object. Next, the method 650 may move to the decision step 664.

In the decision step 664, the CNN module 190b may determine whether the classification of the objects 370a-370b in the video frames 230a-230n indicate a false positive. For example, the AI model 250 may comprise the feature set 220 that indicates which objects may be considered false positives and/or objects of interest. If the classification of the detected object indicates a false positive, then the method 650 may move to the step 666. In the step 666, the PIR controller 232 may determine an amount of time to disable the activation sensors 152a-152n that detected the false positive object based on the object class. In an example, the PIR controller 232 may select various predetermined amounts of time for disabling the activation sensors 152a-152n based on an object type or class. For example, a small animal (e.g., a squirrel) may stay in the coverage areas 310a-310n for a short amount of time so a small animal object class may be associated with a short (e.g., 5 minutes, 10 minutes, 15 minutes, etc.) amount of time for disabling the activation sensors 152a-152n. In another example, the tree branch 64 may move consistently due to wind, so a tree branch object class may be associated with a longer amount of time (e.g., 30 minutes, an hour, a day, etc.) for disabling the activation sensors 152a-152n. Next, in the step 668, the PIR controller 232 may generate the parameter calibration signals PCT_A-PCT_N for the activation sensors 152a-152n that detected the false positive. Since the activation sensors 152a-152n were activated due to a false positive, the processor 102 may return to the low power mode of operation in the step 676.

In the decision step 664, if the classification of the object does not indicate a false positive, then the method 650 may move to the step 670. In the step 670, the processor 102 may receive the pixel data so that the processor 102 may capture and/or record the video frames 230a-230n while performing the computer vision operations. Next, the method 650 may move to the decision step 672. In the decision step 672, the processor 102 may determine whether the detected objects are still within the field of view 302a-302c of one or more of the capture devices 104a-104n. For example, the CNN module 190b may track the location of the various objects detected to determine whether the object of interest is still being captured or has left the field of view 302a-302c. If the detected object(s) is still in the field of view 302a-302c, the method 650 may return to the step 670 to continue capturing and/or recording the video frames 230a-230n. If the detected object(s) have left the field of view 302a-302c, the method 650 may move to the decision step 674.

In the decision step 674, the processor 102 may determine whether a threshold time has elapsed. The threshold amount of time may be an amount of time after all objects of interest have left the field of view 302a-302c that the processor 102 may stop recording the video frames 230a-230n. For example, the threshold amount of time may enable some additional contextual information to be captured even after the object(s) are no longer in the video frames 230a-230n. In another example, the threshold amount of time may ensure that the recording of the video frames 230a-230n is not stopped too soon (e.g., an object temporarily leaves the field of view 302a-302c but then returns shortly after). The amount of time set for the threshold amount of time may be varied according to the design criteria of a particular implementation. If the threshold amount of time has not elapsed, then the method 650 may return to the step 670 to continue recording the video frames 230a-230n. If the threshold amount of time has elapsed, then the method 650 may move to the step 676. In the step 676, the processor 102 may operate in the low power mode of operation. For example, the processor 102 may generate the signals CTL_A-CTL_N to stop the capture devices 104a-104n from capturing the pixel data, the video frames 230a-230n may not be generated, the CNN module 190b may stop performing the computer vision operations and the processor 102 may monitor the activation sensors 152a-152n for the activation signals SEN_A-SEN_N to determine when to return to the video/image recording mode of operation. Next, the method 650 may move to the step 678. The step 678 may end the method 650.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive (i) pixel data generated by a capture device and (ii) an activation signal generated by at least one of a plurality of activation sensors; and
   a processor configured to (i) receive said pixel data from said interface, (ii) process said pixel data arranged as video frames, (iii) perform computer vision operations on said video frames to detect objects, (iv) perform a classification of said objects detected based on characteristics of said objects, (v) present a control signal to said capture device in response to receiving said activation signal, (vi) determine whether there is a match between said classification of said objects and a predetermined object class and (vii) generate a calibration signal in response to said match not being detected, wherein
   (a) said capture device is configured to capture said pixel data in response to said control signal,
   (b) said computer vision operations are configured to determine at least one of a plurality of zones that said objects have been detected in,
   (c) each of said plurality of zones comprises a coverage region of one of said activation sensors, and (d) said calibration signal is configured to adjust operating parameters of one of said activation sensors that corresponds to said one of said plurality of zones that comprises said objects that do not have said match.

2. The apparatus according to claim 1, wherein (i) said coverage region of each of said plurality of zones is less than a field of view of said capture device and (ii) implementing said plurality of activation sensors enables each of said plurality of zones to cover a subsection of said field of view of said capture device.

3. The apparatus according to claim 1, wherein said plurality of activation sensors each comprise a passive infrared sensor.

4. The apparatus according to claim 1, wherein said plurality of activation sensors each comprise a radar sensor.

5. The apparatus according to claim 1, wherein said operating parameters adjusted in response to said calibration signal comprise disabling said one of said activation sensors for a predetermined amount of time.

6. The apparatus according to claim 5, wherein said predetermined amount of time for disabling said one of said activation sensors is selected based on said classification of said objects.

7. The apparatus according to claim 1, wherein said operating parameters adjusted in response to said calibration signal comprise a range of said one of said activation sensors.

8. The apparatus according to claim 1, wherein said operating parameters adjusted in response to said calibration signal comprise a sensitivity of one of said activation sensors.

9. The apparatus according to claim 1, wherein (i) said capture device is configured to operate in a low power mode of operation, (ii) said pixel data is not captured during said low power mode of operation and (iii) said capture device is configured to switch to an image capture mode of operation in response to said activation signal.

10. The apparatus according to claim 9, wherein said low power mode of operation is implemented to reduce a drain of a battery of said apparatus.

11. The apparatus according to claim 9, wherein said processor is configured to perform said computer vision operations and video encoding operations when said capture device is in said image capture mode of operation.

12. The apparatus according to claim 1, wherein generating said calibration signal implements an automatic adjustment of said operating parameters of said plurality of activation sensors without intervention by an end-user.

13. The apparatus according to claim 12, wherein (i) said processor is configured to receive user input comprising manual settings for said operating parameters of said activation sensors and (ii) said processor is configured to generate said calibration signal to set said manual settings to override said automatic adjustment of said operating parameters of said activation sensors.

14. The apparatus according to claim 1, wherein said calibration signal is generated after said objects are detected if said classification of said objects is determined to not have said match a predetermined number of times.

15. The apparatus according to claim 1, wherein said predetermined object class comprises a person.

16. The apparatus according to claim 1, wherein said match is not detected in response to one of said objects comprising a moving tree branch.

17. The apparatus according to claim 1, wherein said processor is configured to independently manage said operating parameters for each of said activation sensors in response to said computer vision operations.

18. The apparatus according to claim 1, wherein (i) said objects that do not have said match are false positive detections for generating said control signal and (ii) said operating parameters are adjusted to reduce a likelihood of said activation sensors performing said false positive detections again.

19. The apparatus according to claim 1, wherein said processor comprises a controller configured to correlate said plurality of zones of said activation sensors with locations of a field of view of said video frames based on said operating parameters of said activation sensors.

20. The apparatus according to claim 19, wherein (i) said controller is further configured to receive an object location for said objects in response to said computer vision operations and (ii) determine one or more of said plurality of zones that each of said objects detected are within based on said object location and said correlation of said plurality of zones with said locations of said field of view.

* * * * *